US012686993B2

(12) United States Patent
Nishi

(10) Patent No.: US 12,686,993 B2
(45) Date of Patent: Jul. 21, 2026

(54) SHOVEL AND CONTROL DEVICE FOR SHOVEL

(71) Applicant: SUMITOMO CONSTRUCTION MACHINERY CO., LTD., Tokyo (JP)

(72) Inventor: Takashi Nishi, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 931 days.

(21) Appl. No.: 17/449,142

(22) Filed: Sep. 28, 2021

(65) Prior Publication Data

US 2022/0010526 A1     Jan. 13, 2022

Related U.S. Application Data

(63) Continuation of application No. PCT/JP2020/014318, filed on Mar. 27, 2020.

(30) Foreign Application Priority Data

Mar. 29, 2019    (JP) ................................. 2019-068205

(51) Int. Cl.
*E02F 9/20*        (2006.01)
*E02F 3/32*        (2006.01)
(Continued)

(52) U.S. Cl.
CPC ................ *E02F 9/205* (2013.01); *E02F 3/32* (2013.01); *E02F 3/43* (2013.01); *E02F 9/2041* (2013.01);
(Continued)

(58) Field of Classification Search
CPC . E02F 9/205; E02F 3/32; E02F 9/2004; E02F 9/2296; E02F 9/261; E02F 9/2041;
(Continued)

(56) References Cited

U.S. PATENT DOCUMENTS 7,128,517 B1 * 10/2006 Kurtz ........................ E02F 9/18
                                                                      414/686
8,768,581 B2    7/2014 Mizuochi et al.
(Continued)

FOREIGN PATENT DOCUMENTS

EP        3289847 A1 * 3/2018  ........... A01B 59/043
EP        3951075        2/2022
(Continued)

OTHER PUBLICATIONS

JP 2018-091131 A, Shovel, Okada et al., Filed: Dec. 5, 2017 Pub: Jun. 14, 2018, English Translation (Year: 2018).*
(Continued)

*Primary Examiner* — Thomas E Worden
*Assistant Examiner* — Benjamin J Brosh
(74) *Attorney, Agent, or Firm* — IPUSA, PLLC

(57)        ABSTRACT
A shovel includes a lower traveling body, and an upper swiveling body mounted on the lower traveling body. The upper swiveling body is rotatable. An attachment is attached to the upper swiveling body. A traveling actuator is configured to drive the lower traveling body. An attachment actuator is configured to move the attachment. A control device is provided in the upper swiveling body. The control device is configured to autonomously operate at least one of the traveling actuator and the attachment actuator depending on an inclination of a ground on which the lower traveling body is traveling.

7 Claims, 24 Drawing Sheets

(51) Int. Cl.

| | |
|---|---|
| *E02F 3/43* | (2006.01) |
| *E02F 9/22* | (2006.01) |
| *E02F 9/26* | (2006.01) |
| *G05D 1/628* | (2024.01) |
| *E02F 9/24* | (2006.01) |

(52) U.S. Cl.
CPC ............ *E02F 9/2296* (2013.01); *E02F 9/261* (2013.01); *G05D 1/628* (2024.01); *B60T 2230/03* (2013.01); *E02F 9/2037* (2013.01); *E02F 9/24* (2013.01)

(58) Field of Classification Search
CPC ......... E02F 9/2037; E02F 9/2207; E02F 9/24; B60W 40/076; G01C 21/3822; G05D 1/628; A01B 63/008
See application file for complete search history.

(56) References Cited

U.S. PATENT DOCUMENTS

| | | | | |
|---|---|---|---|---|
| 10,030,354 | B1* | 7/2018 | Dean ....................... | E02F 3/433 |
| 10,858,808 | B2 | 12/2020 | Okada et al. | |
| 10,860,016 | B1 | 12/2020 | Wang et al. | |
| 11,015,320 | B2 | 5/2021 | Zhou et al. | |
| 11,142,442 | B2 | 10/2021 | Gault et al. | |
| 11,319,695 | B2* | 5/2022 | Yamamoto ............. | B60K 35/00 |
| 2005/0027420 | A1 | 2/2005 | Fujishima et al. | |
| 2006/0070746 | A1* | 4/2006 | Lumpkins ............... | E02F 3/844 |
| | | | | 172/2 |
| 2008/0177449 | A1* | 7/2008 | Pickett ................. | A01D 41/141 |
| | | | | 701/50 |
| 2008/0262682 | A1 | 10/2008 | Bergsten | |
| 2009/0088933 | A1 | 4/2009 | Kim et al. | |
| 2011/0022267 | A1* | 1/2011 | Murphy ............... | B60W 50/14 |
| | | | | 701/124 |
| 2012/0232763 | A1 | 9/2012 | Mizuochi et al. | |
| 2013/0066527 | A1 | 3/2013 | Mizuochi et al. | |
| 2014/0002091 | A1* | 1/2014 | Edamura ................. | E02F 9/267 |
| | | | | 324/418 |
| 2015/0345114 | A1 | 12/2015 | Nomura et al. | |
| 2016/0017571 | A1* | 1/2016 | Paull ..................... | E02F 9/2228 |
| | | | | 701/50 |
| 2016/0265186 | A1* | 9/2016 | Kami ...................... | E02F 9/262 |
| 2016/0273196 | A1* | 9/2016 | Funk ........................ | E02F 3/432 |
| 2016/0281335 | A1* | 9/2016 | Benzal ...................... | E02F 3/32 |
| 2016/0356019 | A1 | 12/2016 | Han et al. | |
| 2016/0369480 | A1* | 12/2016 | Mizuochi ................ | F15B 13/06 |
| 2017/0130429 | A1 | 5/2017 | Lafrenier | |
| 2017/0268204 | A1* | 9/2017 | Shimano ................. | E02F 3/435 |
| 2017/0342679 | A1* | 11/2017 | Iwamura ................. | E02F 9/262 |
| 2018/0002895 | A1 | 1/2018 | Misaki | |
| 2018/0016771 | A1 | 1/2018 | Izumikawa | |
| 2018/0051446 | A1 | 2/2018 | Yoshinada et al. | |
| 2018/0230673 | A1* | 8/2018 | Lee ......................... | E02F 3/427 |
| 2018/0245313 | A1 | 8/2018 | Shibamori et al. | |
| 2018/0373966 | A1* | 12/2018 | Beschorner ........... | G01C 21/10 |
| 2020/0139954 | A1* | 5/2020 | Wallstedt ........... | B60W 30/143 |
| 2020/0173791 | A1 | 6/2020 | Misaki | |
| 2021/0002853 | A1* | 1/2021 | Yamashita ........... | E02F 9/2203 |

FOREIGN PATENT DOCUMENTS

| | | | | | |
|---|---|---|---|---|---|
| JP | S60-199130 | | 10/1985 | | |
| JP | H04-136324 | | 5/1992 | | |
| JP | H05-086636 | | 4/1993 | | |
| JP | H07-089434 | | 4/1995 | | |
| JP | H08-269998 | | 10/1996 | | |
| JP | H10-299035 | | 11/1998 | | |
| JP | 2000-104290 | | 4/2000 | | |
| JP | 2006-327227 | | 12/2006 | | |
| JP | 2009-085001 | | 4/2009 | | |
| JP | 2010-196253 | | 9/2010 | | |
| JP | 2014-074319 | | 4/2014 | | |
| JP | 2015-214808 | | 12/2015 | | |
| JP | 2016-084663 | | 5/2016 | | |
| JP | 2016-166505 | | 9/2016 | | |
| JP | 2016-223096 | | 12/2016 | | |
| JP | 2017-145626 | | 8/2017 | | |
| JP | 2018091131 | A * | 6/2018 | | |
| KR | 1020090034618 | | 4/2009 | | |
| KR | 20130068544 | A * | 6/2013 | | |
| WO | WO-2009076719 | A1 * | 6/2009 | ............ | E02F 9/2029 |
| WO | 2016/085000 | | 6/2016 | | |
| WO | 2016/152700 | | 9/2016 | | |
| WO | 2016/158539 | | 10/2016 | | |
| WO | 2019/031551 | | 2/2019 | | |

OTHER PUBLICATIONS

KR 2013-0068544 A, Apparatus for Preventing Ground Contact of a Bucket for an Wheel Loader and Method thereof, Woo et al., Filed: Dec. 15, 2011 Pub: Jun. 26, 2013, English Translation (Year: 2013).*

EP3289847a1, Arrangement for Influencing the Position of an Agricultural Attachment, Martin et al., Filed: Aug. 24, 2017 Pub: Mar. 7, 2018, English Translation (Year: 2018).*

NASA, "Pythagorean Theorem", updated May 2021 (date irrelevant, used as MPEP 2124 reference), Retrieved from internet Oct. 2025, URL: <https://www.grc.nasa.gov/www/k-12/airplane/pythag.html> (Year: 2021).*

International Search Report for PCT/JP2020/014318 mailed on Jun. 16, 2020.

International Search Report for PCT/JP2018/025061 mailed on Sep. 11, 2018.

Office Action dated Dec. 3, 2021 issued to related U.S. Appl. No. 16/809,781.

* cited by examiner

SHOVEL AND CONTROL DEVICE FOR SHOVEL

RELATED APPLICATIONS

This patent application is a continuation of International Patent Application No. PCT/JP2020/014318, filed on Mar. 27, 2020, which is based upon and claims priority to Japanese Patent Application No. 2019-068205, filed on Mar. 29, 2019, the entire contents of each of which is incorporated herein by reference.

BACKGROUND

1. Field of the Invention

The present disclosure relates to a shovel and a control device for a shovel.

2. Description of the Related Art

Conventionally, a shovel with an attachment including a boom, an arm and a bucket is known.

The center of gravity of the shovel is at a relatively high position because the shovel includes the attachments.

Therefore, it is desirable to provide a shovel that can inhibit oscillation while traveling.

SUMMARY OF THE INVENTION

A shovel according to an embodiment of the present invention includes a lower traveling body, and an upper swiveling body mounted on the lower traveling body. The upper swiveling body is rotatable. An attachment is attached to the upper swiveling body. A traveling actuator is configured to drive the lower traveling body. An attachment actuator is configured to move the attachment. A control device is provided in the upper swiveling body. The control device is configured to autonomously operate at least one of the traveling actuator and the attachment actuator depending on the inclination of the ground on which the lower traveling body is traveling.

DETAILED DESCRIPTION OF THE PREFERRED EMBODIMENTS

Figure 1:
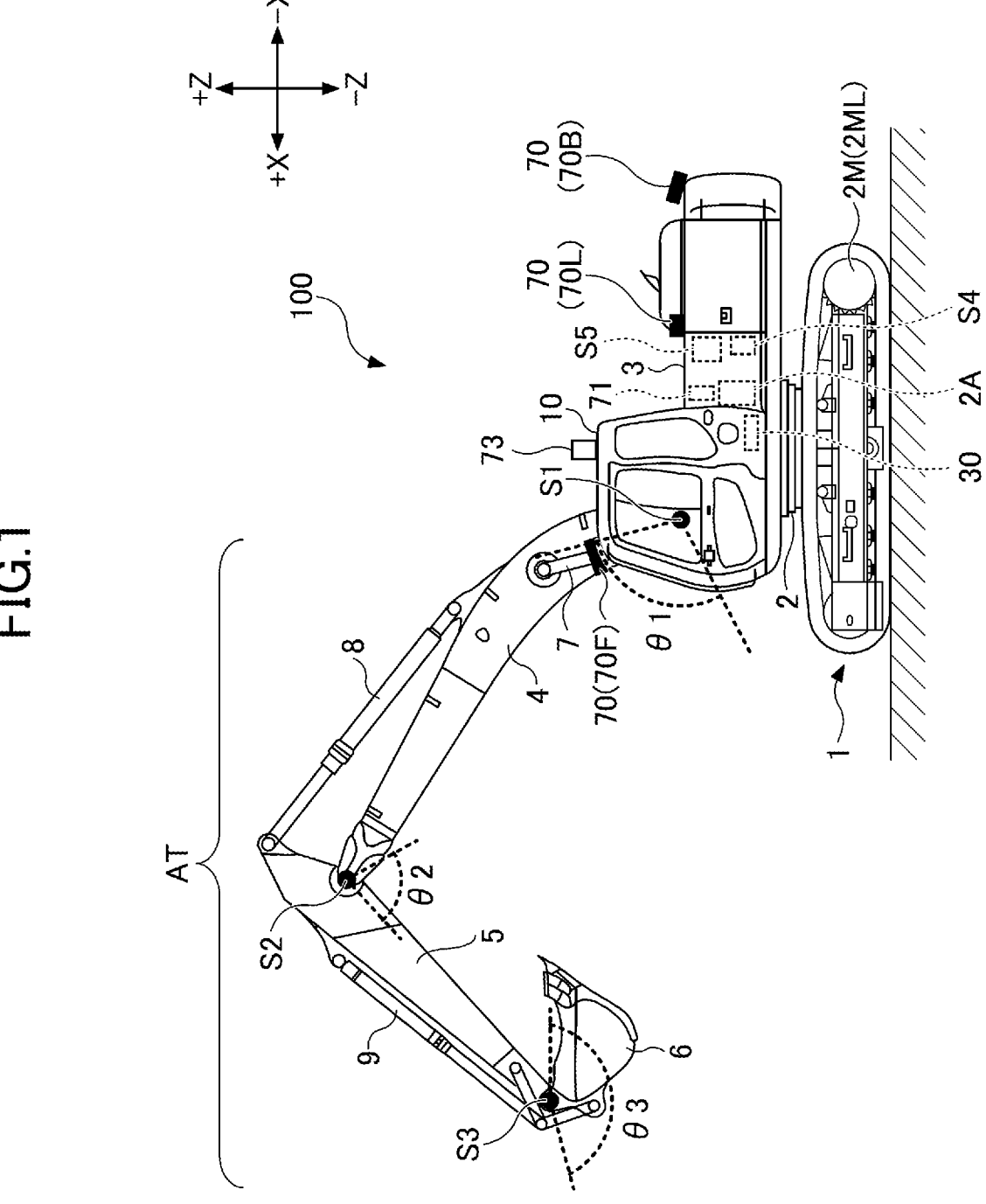
FIG. 1 is a side view of a shovel according to an embodiment of the present invention.
Figure 2:
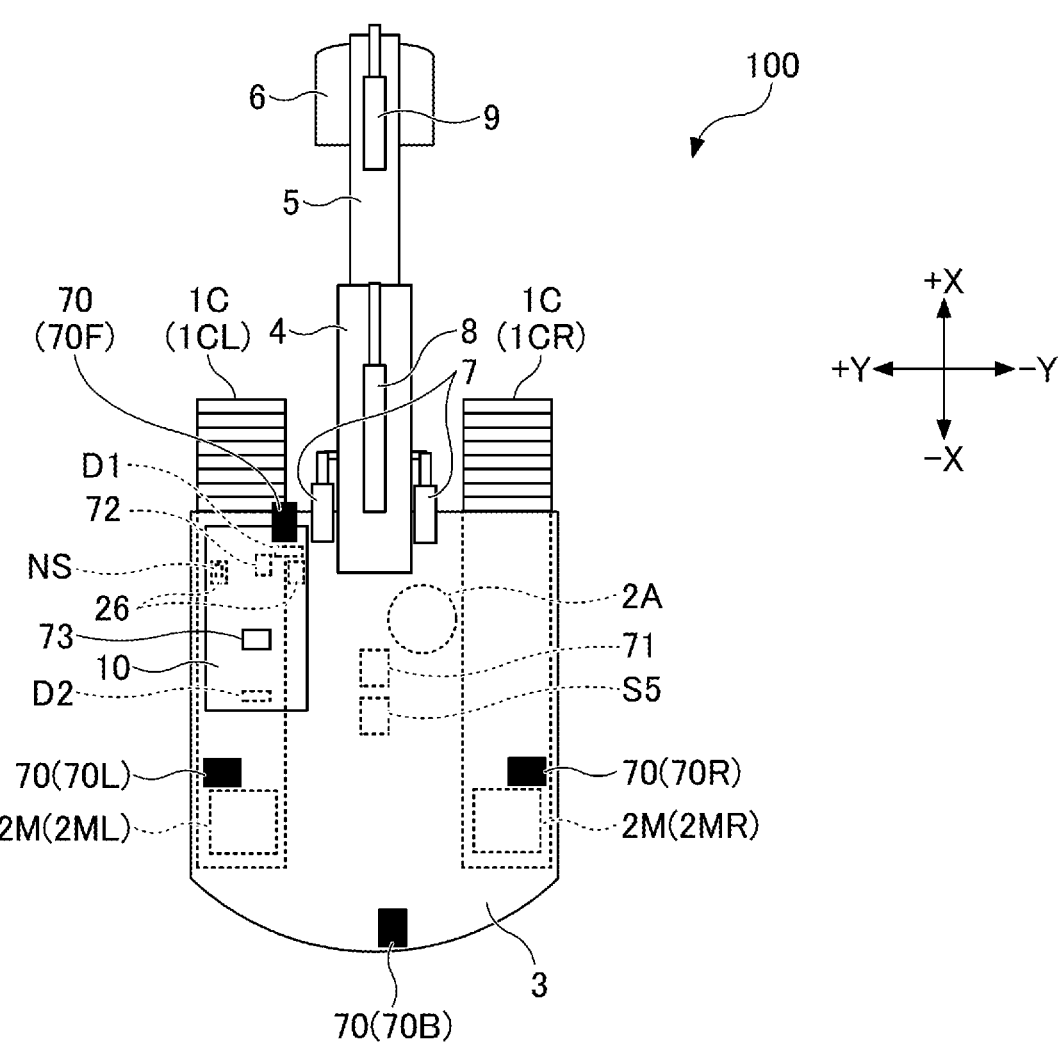
FIG. 2 is a plane view of the shovel illustrated in FIG. 1.

First, a shovel 100 as an excavator according to the embodiment of the present invention will be described with reference to FIGS. 1 and 2. FIG. 1 is a side view of the shovel 100 and FIG. 2 is a plan view of the shovel 100.

In this embodiment, the lower traveling body 1 of the shovel 100 includes a crawler 1C. The crawler 1C is driven by a traveling hydraulic motor 2M as a traveling actuator mounted on the lower traveling body 1. Specifically, the crawler 1C includes a left crawler 1CL and a right crawler 1CR. The left crawler 1CL is driven by a left traveling hydraulic motor 2ML, and the right crawler 1CR is driven by a right traveling hydraulic motor 2MR.

The upper swiveling body 3 is mounted on the lower traveling body 1 through the swiveling mechanism 2 so as to be able to swivel. The swiveling mechanism 2 is driven by a swiveling hydraulic motor 2A as a swiveling actuator mounted on the upper swiveling body 3. However, the swiveling actuator may be a swiveling motor generator as an electric actuator.

A boom 4 is attached to the upper swiveling body 3. An arm 5 is attached to the distal end of the boom 4, and a bucket 6 as an end attachment is attached to the distal end of the arm 5. The boom 4, arm 5, and bucket 6 form an excavation attachment AT, which is an example of the attachment. The boom 4 is driven by a boom cylinder 7, the arm 5 is driven by an arm cylinder 8, and the bucket 6 is driven by a bucket cylinder 9. The boom cylinder 7, the arm cylinder 8, and the bucket cylinder 9 form an attachment actuator.

The boom 4 is rotatably supported up and down with respect to the upper swiveling body 3. The boom angle sensor S1 is mounted on the boom 4. The boom angle sensor S1 can detect the boom angle $\theta 1$, which is the rotation angle of the boom 4. The boom angle $\theta 1$ is, for example, the angle of rise from the state where the boom 4 is lowered most. Therefore, the boom angle $\theta 1$ is maximized when the boom 4 is raised to the maximum.

The arm 5 is rotatably supported relative to the boom 4. An arm angle sensor S2 is mounted on the arm 5. The arm angle sensor S2 can detect the arm angle $\theta 2$, which is the rotation angle of the arm 5. The arm angle θ2 is, for example, an open angle from the most retracted state of the arm 5. Therefore, the arm angle θ2 is maximized when the arm 5 is extended most.

The bucket 6 is rotatably supported relative to the arm 5. A bucket angle sensor S3 is mounted on the bucket 6. The bucket angle sensor S3 can detect the bucket angle θ3, which is the rotation angle of the bucket 6. The bucket angle 83 is the opening angle from the most closed state of the bucket 6. Therefore, the bucket angle θ3 is maximized when the bucket 6 is opened most.

In the embodiment of FIG. 1, the boom angle sensor S1, the arm angle sensor S2, and the bucket angle sensor S3 each forms a combination of an acceleration sensor and a gyro sensor. However, it may be formed with only the acceleration sensor. The boom angle sensor S1 may be a stroke sensor mounted on the boom cylinder 7, a rotary encoder, a potentiometer, an inertia measuring device, or the like. The same applies to the arm angle sensor S2 and the bucket angle sensor S3.

The upper swiveling body 3 is provided with a cabin 10 as an operator's cab and a power source such as an engine 11 is mounted thereon. A space recognition device 70, a direction detecting device 71, a positioning device 73, a body inclination sensor S4, and a swivel angular velocity sensor S5 are mounted on the upper swiveling body 3. The cabin 10 is provided with an operation device 26, a controller 30, an information input device 72, a display device D1, a voice output device D2, or the like. For convenience, the side where the excavation attachment AT is mounted in the upper swiveling body 3 is the front side, and the side where the counterweight is mounted is the rear side.

The space recognition device 70 is configured to recognize an object present in the three-dimensional space around the shovel 100. The space recognition device 70 is configured to compute the distance from the space recognition device 70 or the shovel 100 to the recognized object. The space recognition device 70 may be, for example, an ultrasonic sensor, a millimeter wave radar, a monocular camera, a stereo camera, a LIDAR, a distance image sensor, or an infrared sensor. In this embodiment, the space recognition device 70 is a LIDAR and is configured to emit a large number of laser beams in a number of directions and receive the reflected light to compute the distance and the direction of an object from the reflected light. The same applies to a case where the millimeter-wave radar or the like as the space recognition device 70 emits electromagnetic waves toward the object. In this embodiment, the space recognition device 70 includes a forward sensor 70F mounted at the upper surface front end of the cabin 10, a backward sensor 70B mounted at the upper surface back end of the upper swiveling body 3, a leftward sensor 70L mounted at the upper surface left end of the upper swiveling body 3, and a rightward sensor 70R mounted at the upper surface right end of the upper swiveling body 3. An upper sensor for recognizing the object present in a space above the upper swiveling body 3 may be attached to the shovel 100.

The space recognition device 70 is, for example, a monocular camera including an imaging device such as a CCD or CMOS, and outputs a taken image to the display device D1. The space recognition device 70 may not only utilize the taken image, but also detect the distance and direction of the object from the reflected signal by transmitting many signals (such as laser light) to the object and receiving the reflected signal when a LIDAR, a milli-wave radar, an ultrasonic sensor, or a laser radar is used as the space recognition device 70.

The space recognition device 70 may be configured to detect an object present around the shovel 100. The object may be, for example, a landform (slope or hole, and the like), a wire, a pole, a person, an animal, a vehicle, a construction machine, a building, a wall, a helmet, a safety vest, work clothing, or a predetermined mark on the helmet. The space recognition device 70 may be configured to identify at least one of an object's type, a position, a shape, and the like. The space recognition device 70 may be configured to distinguish a person from an object other than a person.

The direction detection device 71 is configured to detect information regarding a relative relationship between the direction of the upper swiveling body 3 and the direction of the lower traveling body 1. The direction detection device 71 may be formed by, for example, a combination of a geomagnetic sensor mounted on the lower traveling body 1 and a geomagnetic sensor mounted on the upper swiveling body 3. Alternatively, the direction detection device 71 may be formed by a combination of a GNSS receiver mounted on the lower traveling body 1 and a GNSS receiver mounted on the upper swiveling body 3. The direction detection device 71 may be a rotary encoder, a rotary position sensor, or the like. In the structure in which the upper swiveling body 3 is driven to swivel by the swivel motor generator, the direction detection device 71 may include a resolver. The direction detection device 71 may be mounted, for example, in a center joint disposed in connection with the swiveling mechanism 2 for realizing the relative rotation between the lower traveling body 1 and the upper swiveling body 3.

The direction detection device 71 may include a camera mounted on the upper swiveling body 3. In this case, the direction detection device 71 performs conventional image processing on an image (input image) captured by a camera mounted on the upper swiveling body 3 and detects the image of the lower traveling body 1 included in the input image. The direction detection device 71 specifies the longitudinal direction of the lower traveling body 1 by detecting an image of the lower traveling body 1 using conventional image recognition techniques. The direction detection device 71 derives the angle formed between a direction of the front and rear axes of the upper swiveling body 3 and a longitudinal direction of the lower traveling body 1. The direction of the forward and backward axis of the upper swiveling body 3 is derived from the camera mounted position. Because the crawler 1C protrudes from the upper swiveling body 3, the direction detection device 71 can determine the longitudinal direction of the lower traveling body 1 by detecting an image of the crawler 1C. The direction detection device 71 may be integrated with the controller 30.

The information input device 72 is configured so that the operator of the shovel can input information to the controller 30. In this embodiment, the information input device 72 is a switch panel located adjacent to a display unit of the display device D1. However, the information input device 72 may be a touch panel disposed on the display unit of the display device D1 or a voice input device such as a microphone disposed in the cabin 10. The information input device 72 may be a communication device. In this case, the operator can input information to the controller 30 via a communication terminal, such as a smartphone.

The positioning device 73 is configured to measure the present position. In this embodiment, the positioning device 73 is a GNSS receiver that detects the position of the upper swiveling body 3 and outputs the detected value to the controller 30. The positioning device 73 may be a GNSS compass. In this case, the positioning device 73 can detect the position and direction of the upper swiveling body 3.

The body inclination sensor S4 detects an inclination of the upper swiveling body 3 relative to a predetermined plane. In this embodiment, the body inclination sensor S4 is an acceleration sensor that detects an inclination angle about the forward and backward axes of the upper swiveling body 3 with respect to the horizontal plane and an inclination angle about the right and left axes. The forward and backward and left and right axes of the upper swiveling body 3 each pass through a shovel center point, which is a point on the swivel axis of the shovel 100, and are perpendicular to each other, for example.

The rotation angular velocity sensor S5 detects the rotation angular velocity of the upper pivot body 3. In this embodiment, it is a gyro sensor. The pivot angular velocity sensor S5 may be a resolver, a rotary encoder, or the like. The pivot angular velocity sensor S5 may detect the pivot velocity. The pivot speed may be calculated from the pivot angular velocity.

Hereinafter, at least one of the boom angle sensor S1, the arm angle sensor S2, the bucket angle sensor S3, the body inclination sensor S4, and the pivot angle sensor S5 is also referred to as an attitude detecting device. The orientation of the drilling attachment AT is detected, for example, based on the outputs of the boom angle sensor S1, the arm angle sensor S2 and the bucket angle sensor S3, respectively.

Display device D1 is a device for displaying information. In this embodiment, display D1 is a liquid crystal display located within cabin 10. However, the display device D1 may be a display of a communication terminal such as a smartphone.

The voice output device D2 is a device that outputs voice. Audio output device D2 includes a device for outputting speech to an operator within cabin 10 and at least one of a device for outputting speech to an operator outside cabin 10. It may be a speaker attached to the communication terminal.

The controller 30 (an example of a processing circuitry or a processor) is a control device for controlling the shovel 100. In this embodiment, the controller 30 is formed by a computer including a CPU, a volatile storage device, a non-volatile storage device, and the like. The controller 30 reads programs corresponding to each function from the non-volatile storage device (an example of a memory) and loads the program to the volatile storage device (also, an example of a memory), and causes the CPU (central processing unit, an example of a processor) to perform the corresponding process. Each function includes, for example, a machine guidance function that guides an operator's manual operation of the shovel 100 and a machine control function that supports or causes the operator's manual operation of the shovel 100 to operate automatically or autonomously. The controller 30 may include a contact avoiding function to automatically or autonomously operate or stop the shovel 100 in order to avoid contact the shovel 100 with an object present within the periphery of the shovel 100. The object around the shovel 100 is monitored not only within the monitoring range but also outside the monitoring range. On this occasion, the controller 30 detects the type and position of the object.

Figure 3:
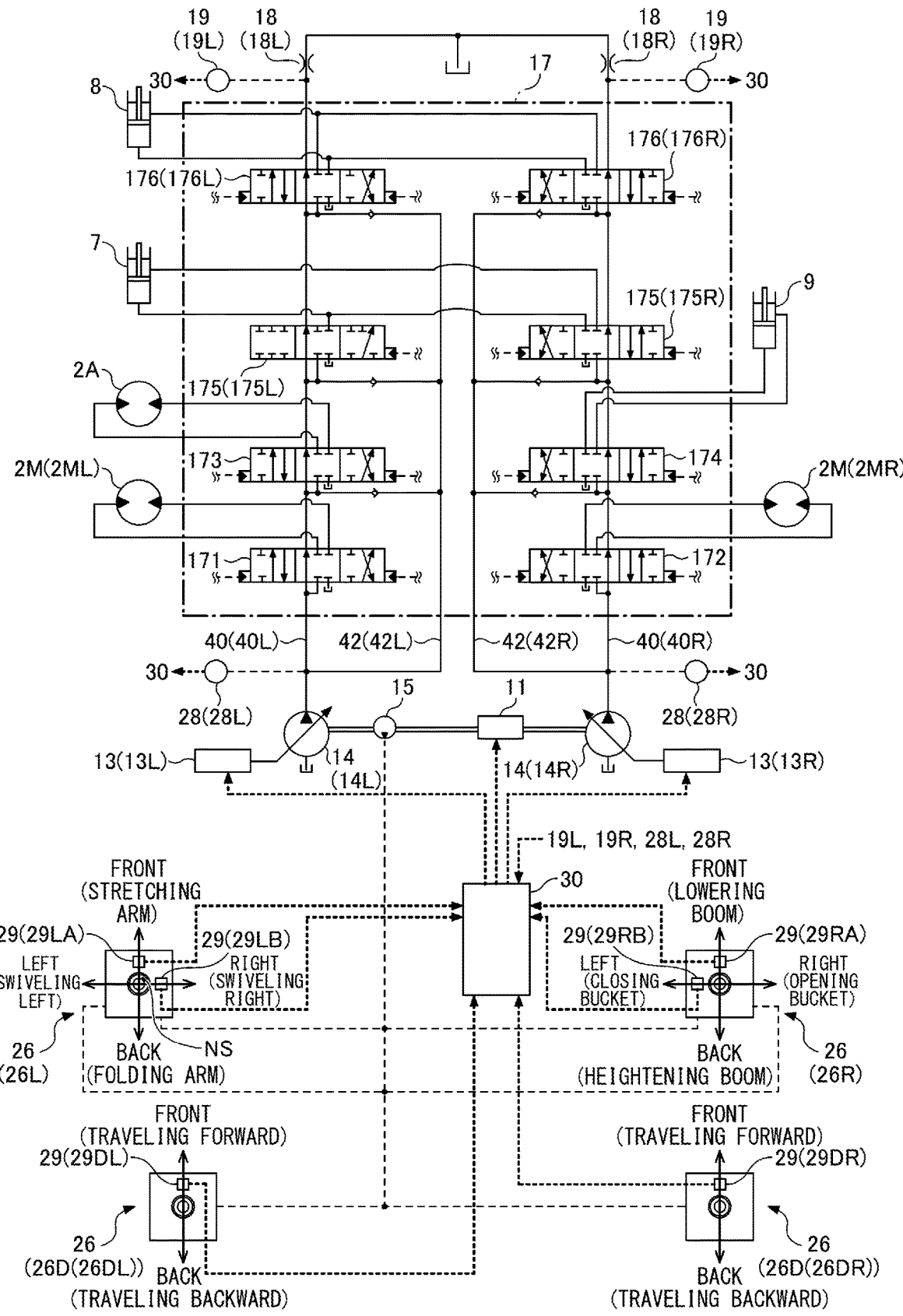
FIG. 3 is a diagram illustrating an example of the structure of a hydraulic system mounted on the shovel illustrated in FIG. 1.

Next, an example of the structure of a hydraulic system mounted on a shovel 100 will be described with reference to FIG. 3. FIG. 3 is a diagram illustrating an example of a structure of a hydraulic system mounted on the shovel 100. In FIG. 3, the mechanical power transmission system is indicated by a double line; hydraulic oil lines are indicated by solid line; pilot lines are indicated by dashed lines; and electric control system are indicated by broken lines.

The hydraulic system of the shovel 100 primarily includes an engine 11, a regulator 13, a main pump 14, a pilot pump 15, a control valve 17, an operation device 26, a discharge pressure sensor 28, an operation pressure sensor 29, a controller 30, and the like.

In FIG. 3, the hydraulic system is configured to circulate the hydraulic oil from the main pump 14 driven by the engine 11 to the hydraulic oil tank via a center bypass tube 40 or a parallel tube 42.

The engine 11 is a driving source of the shovel 100. In this embodiment, the engine 11 is, for example, a diesel engine that operates to maintain a predetermined speed. The output shaft of the engine 11 is coupled to the input shaft of the main pump 14 and pilot pump 15.

The main pump 14 is configured to supply the hydraulic oil to the control valve 17 via the hydraulic oil line. In this embodiment, the main pump 14 is a swash plate variable displacement hydraulic pump.

The regulator 13 is configured to control the discharge amount of the main pump 14. In this embodiment, the regulator 13 controls the discharge amount of the main pump 14 by adjusting the tilt angle of the main pump 14 in response to a control command from the controller 30.

The pilot pump 15 is configured to supply the hydraulic oil through a pilot line to a hydraulic control device including the operation device 26. In this embodiment, the pilot pump 15 is a fixed capacitive hydraulic pump. The main pump 14 may be configured to perform the function performed by the pilot pump 15. In this case, the pilot pump 15 may be omitted.

The control valve 17 is a hydraulic controller for controlling the hydraulic system at the shovel 100. In this embodiment, the control valve 17 includes control valves 171-176. The control valve 175 includes a control valve 175L and control valve 175R, and the control valve 176 includes a control valve 176L and control valve 176R. The control valve 17 is configured to selectively supply one or more hydraulic actuators through the control valves 171-176 to the hydraulic oil discharged by the main pump 14. The control valves 171-176 control, for example, the flow of hydraulic oil from the main pump 14 to the hydraulic actuator and the flow of hydraulic oil from the hydraulic actuator to the hydraulic oil tank. The hydraulic actuators include a boom cylinder 7, arm cylinder 8, bucket cylinder 9, left traveling hydraulic motor 2ML, right traveling hydraulic motor 2MR, and swiveling hydraulic motor 2A.

The operation device 26 is a device used to operate the actuator by the operator. The operation device 26 includes, for example, an operation lever and an operation pedal. The actuator includes at least one of a hydraulic actuator and an electric actuator. In this embodiment, the operation device 26 is configured to supply the hydraulic oil discharged by the pilot pump 15 to a pilot port of a corresponding control valve within the control valve 17 via a pilot line. The pressure (pilot pressure) of the hydraulic oil supplied to each of the pilot ports is the pressure corresponding to the direction and operation amount of the operation device 26 corresponding to each of the hydraulic actuators. However, the operation device 26 may be electrically controlled rather than a pilot pressure system as described above. In this case, the control valve in the control valve 17 may be a electromagnetic spool valve.

The discharge pressure sensor 28 is configured to detect the discharge pressure of the main pump 14. Within this embodiment, the discharge pressure sensor 28 outputs the detected value to the controller 30.

The operation pressure sensor 29 is configured to detect the content of an operation of the operation device 26 by the operator. In this embodiment, the operation pressure sensor 29 detects the operation direction and the operation amount of the operation device 26 corresponding to each of the actuators in a form of pressure (operating pressure) and outputs the detected value to the controller 30. The content of the operation of the operation device 26 may be detected using a sensor other than an operation pressure sensor.

The main pump 14 includes a left main pump 14L and a right main pump 14R. The left main pump 14L circulates a hydraulic oil through the left center bypass tube 40L or the left parallel tube 42L to a hydraulic oil tank, and the right main pump 14R circulates hydraulic oil through the right center bypass tube 40R or the right parallel tube 42R to the hydraulic oil tank.

The left center bypass tube 40L is a hydraulic oil line passing through the control valves 171, 173, 175L and 176L that are disposed within the control valve 17. The right center bypass tube 40R is a hydraulic oil line passing through the control valves 172, 174, 175R and 176R that are disposed within the control valve 17.

The control valve 171 is a spool valve that feeds the hydraulic oil discharged by the left main pump 14L to the left traveling hydraulic motor 2ML and switches the flow of the hydraulic oil in order to discharge the hydraulic oil discharged by the left traveling hydraulic motor 2ML to the hydraulic oil tank.

The control valve 172 is a spool valve that feeds the hydraulic oil discharged by the right main pump 14R to the right traveling hydraulic motor 2MR and switches the flow of hydraulic oil in order to discharge the hydraulic oil discharged by the right traveling hydraulic motor 2MR to the hydraulic oil tank.

The control valve 173 is a spool valve that supplies the hydraulic oil discharged by the left main pump 14L to the swiveling hydraulic motor 2A and switches the flow of hydraulic oil in order to discharge the hydraulic oil discharged by the swiveling hydraulic motor 2A to the hydraulic oil tank.

The control valve 174 is a spool valve that feeds the hydraulic oil discharged by the right main pump 14R to the bucket cylinder 9 and switches the flow of hydraulic oil in order to discharge the hydraulic oil in the bucket cylinder 9 to the hydraulic oil tank.

The control valve 175L is a spool valve that switches the flow of hydraulic oil in order to supply the hydraulic oil discharged by the left main pump 14L to the boom cylinder 7. The control valve 175R is a spool valve that feeds the hydraulic oil discharged by the right main pump 14R to the boom cylinder 7 and switches the flow of hydraulic oil in order to discharge the hydraulic oil in the boom cylinder 7 to the hydraulic oil tank.

The control valve 176L is a spool valve which feeds the hydraulic oil discharged by the left main pump 14L to the arm cylinder 8 and switches the flow of hydraulic oil in order to discharge the hydraulic oil in the arm cylinder 8 to the hydraulic oil tank.

The control valve 176R is a spool valve which feeds the hydraulic oil discharged by the right main pump 14R to the arm cylinder 8 and switches the flow of the hydraulic oil in order to discharge the hydraulic oil in the arm cylinder 8 to the hydraulic oil tank.

The left parallel tube 42L is a hydraulic oil line disposed in parallel to the left center bypass tube 40L. The left parallel tube 42L can supply the hydraulic oil to the control valves on the downstream side when the flow of the hydraulic oil passing through the left center bypass tube 40L is restricted or interrupted by either one of the control valves 171, 173, and 175L. The right parallel tube 42R is a hydraulic oil line disposed in parallel to the right center bypass tube 40R. The right parallel tube 42R can supply the hydraulic oil to the control valves on the downstream side when the flow of the hydraulic oil passing through the right center bypass tube 40R is limited or shut off by either one of the control valves 172, 174, and 175R.

The regulator 13 includes a left regulator 13L and a right regulator 13R. The left regulator 13L controls the discharge amount of the left main pump 14L by adjusting the tilt angle of the swash plate of the left main pump 14L in accordance with the discharge pressure of the left main pump 14L. Specifically, the left regulator 13L adjusts the tilt angle of a swash plate of the left main pump 14L in response to an increase in the discharge pressure of the left main pump 14L to reduce the discharge amount. The same applies to the right regulator 13R. This is provided that the absorbed horsepower of the main pump 14, which is expressed as the product of the discharge pressure and the discharge amount, does not exceed the output horsepower of the engine 11.

The operation device 26 includes a left operation lever 26L, a right operation lever 26R, and a traveling lever 26D. The traveling lever 26D includes a left traveling lever 26DL and a right traveling lever 26DR.

The left operation lever 26L is used for the swivel operation and the operation of the arm 5. The left operation lever 26L, when operated in forward and backward directions, utilizes the hydraulic oil discharged by the pilot pump 15 to introduce a control pressure according to the lever operation amount into the pilot port of the control valve 176. When operated in the rightward and leftward directions, the hydraulic oil discharged by the pilot pump 15 is used to introduce the control pressure according to the lever operation amount into a pilot port of the control valve 173.

Specifically, the left operation lever 26L introduces the hydraulic oil to the right pilot port of the control valve 176L and introduces the hydraulic oil to the left pilot port of the control valve 176R when operated in the arm retracting direction. The left operation lever 26L, when operated in an arm extending direction, introduces the hydraulic oil to the left pilot port of the control valve 176L and introduces the hydraulic oil to the right pilot port of the control valve 176R. The left operation lever 26L introduces the hydraulic oil to the left pilot port of the control valve 173 when it is operated in the left swiveling direction and introduces hydraulic oil to the right pilot port of the control valve 173 when it is operated in the right swiveling direction.

The right operation lever 26R is used to operate the boom 4 and the bucket 6. The right operation lever 26R utilizes the hydraulic oil discharged by the pilot pump 15 when operated in the forward and backward directions to introduce a control pressure according to the lever operation amount into the pilot port of the control valve 175. When operated in the rightward and leftward directions, the hydraulic oil discharged by the pilot pump 15 is used to introduce the control pressure according to the amount of lever operated into the pilot port of the control valve 174.

Specifically, the right operation lever 26R introduces the hydraulic oil to the left pilot port of the control valve 175R when operated in the boom lowering direction. The right operation lever 26R, when operated in the boom heightening direction, introduces the hydraulic oil to the right pilot port of the control valve 175L and introduces the hydraulic oil to the left pilot port of the control valve 175R. The right operation lever 26R also introduces the hydraulic oil to the right pilot port of the control valve 174 when it is operated in the bucket closing direction, and introduces the hydraulic oil to the left pilot port of the control valve 174 when it is operated in the bucket opening direction.

The traveling lever 26D is used to operate the crawler 1C. Specifically, the left traveling lever 26DL is used to operate the left crawler 1CL. It may be configured to interlock with the left traveling pedal. The left traveling lever 26DL, when operated in the forward and backward directions, utilizes the hydraulic oil discharged by the pilot pump 15 to introduce the control pressure according to the lever operation amount into the pilot port of the control valve 171. The right traveling lever 26DR is used to operate the right crawler 1CR. It may be configured to interlock with the right traveling pedal. The right traveling lever 26DR, when operated in the forward and backward directions, utilizes the hydraulic oil discharged by the pilot pump 15 to introduce the control pressure according to the lever operation amount into the pilot port of the control valve 172.

The discharge pressure sensor 28 includes the discharge pressure sensor 28L and the discharge pressure sensor 28R. The discharge pressure sensor 28L detects the discharge pressure of the left main pump 14L and outputs a detected value to the controller 30. The same applies to the discharge pressure sensor 28R.

The operation pressure sensor 29 includes operation pressure sensors 29LA, 29LB, 29RA, 29RB, 29DL, and 29DR. The operation pressure sensor 29LA detects the content of the operation in the forward and backward directions by the operator relative to the left operation lever 26L in the form of pressure and outputs the detected value to the controller 30. The content of the operation is, for example, the lever operation direction and the lever operation amount (lever operation angle).

Similarly, the operation pressure sensor 29LB detects the content of the operator's operation of the left operation lever 26L in the rightward and leftward directions in the form of pressure and outputs the detected value to the controller 30. The operation pressure sensor 29RA detects the content of an operator's operation of the right operation lever 26R in the forward and backward directions in the form of pressure and outputs the detected value to the controller 30. The operation pressure sensor 29RB detects the content of the operation by the operator in the leftward and rightward directions relative to the right operation lever 26R in the form of pressure and outputs the detected value to the controller 30. The operation pressure sensor 29DL detects the content of the operation in the forward and backward directions relative to the left traveling lever 26DL by the operator in the form of pressure and outputs the detected value to the controller 30. The operation pressure sensor 29DR detects the content of the operation in the forward and backward direction relative to the right traveling lever 26DR by the operator in the form of pressure and outputs the detected value to the controller 30.

The controller 30 receives the output of the operation pressure sensor 29 and outputs a control command to the regulator 13 as needed to change the discharge amount of the main pump 14. The controller 30 receives the output of the control pressure sensor 19 disposed upstream of the control valve 18, outputs a control command to the regulator 13 as necessary, and changes the discharge amount of the main pump 14. The control valve 18 includes a left control valve 18L and a right control valve 18R, and the control pressure sensor 19 includes a left control pressure sensor 19L and a right control pressure sensor 19R.

In the left center bypass tube 40L, a left control valve 18L is disposed between the control valve 176L, which is the lowest downstream, and the hydraulic oil tank. Therefore, the flow of hydraulic oil discharged by the left main pump 14L is limited by the left control valve 18L. The left control valve 18L generates a control pressure for controlling the left regulator 13L. The left control pressure sensor 19L is a sensor for detecting this control pressure and outputs a detected value to the controller 30. The controller 30 controls the discharge amount of the left main pump 14L by adjusting the tilting angle of the swash plate of the left main pump 14L in response to the control pressure. The controller 30 decreases the discharge amount of the left main pump 14L as the control pressure increases, and increases the discharge amount of the left main pump 14L as the control pressure decreases. The discharge amount of the right main pump 14R is similarly controlled.

Specifically, when none of the hydraulic actuators of the shovel 100 is in the standby state as illustrated in FIG. 3, the hydraulic oil discharged by the left main pump 14L passes through the left center bypass tube 40L and reaches the left control valve 18L. The flow of the hydraulic oil discharged by the left main pump 14L increases the control pressure generated upstream of the left control valve 18L.

As a result, the controller 30 reduces the discharge amount from the left main pump 14L to the allowable minimum discharge amount and suppresses the pressure loss (pumping loss) when the discharged hydraulic oil passes through the left center bypass tube 40L. On the other hand, when any of the hydraulic actuators is operated, the hydraulic oil discharged by the left main pump 14L flows into the hydraulic actuator to be operated through a control valve corresponding to the hydraulic actuator to be operated. The flow of hydraulic oil discharged by the left main pump 14L decreases or extinguishes the amount reaching the left control valve 18L, thereby reducing the control pressure generated upstream of the left control valve 18L. As a result, the controller 30 increases the discharge rate of the left main pump 14L to circulate sufficient hydraulic oil in the hydraulic actuator to be operated to ensure drive of the hydraulic actuator to be operated. The controller 30 controls the discharge amount of the right main pump 14R in the same manner.

With the structure described above, the hydraulic system of FIG. 3 can reduce wasted energy consumption at the main pump 14 in standby conditions. The wasted energy consumption includes pumping losses caused by the hydraulic oil discharged by the main pump 14 in the center bypass tube 40. The hydraulic system of FIG. 3 also ensures that sufficient hydraulic fluid is supplied from the main pump 14 to the hydraulic actuator to be actuated when the hydraulic actuator is operated.

Figure 4A:
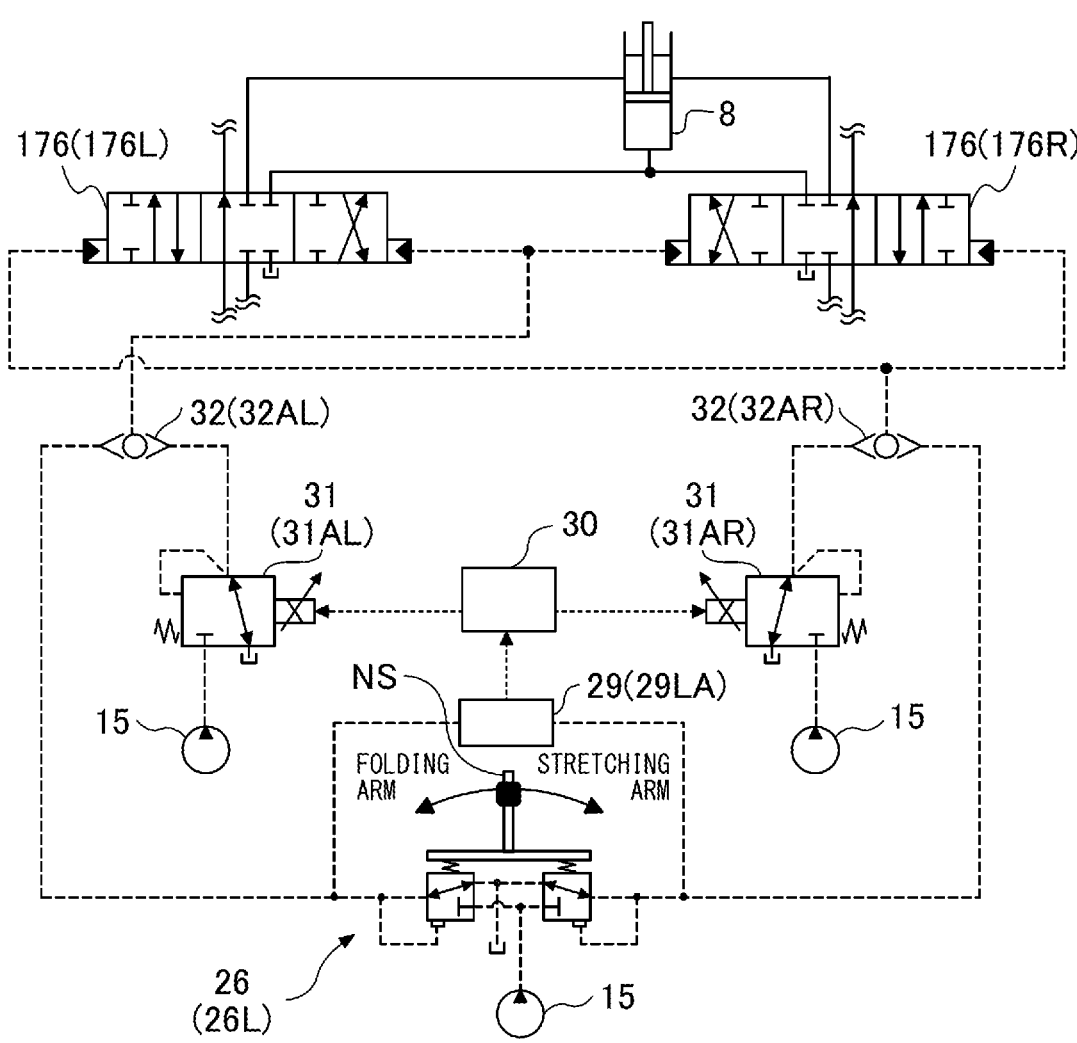
FIG. 4A is a view of a part of a hydraulic system for operating an arm cylinder.
Figure 4B:
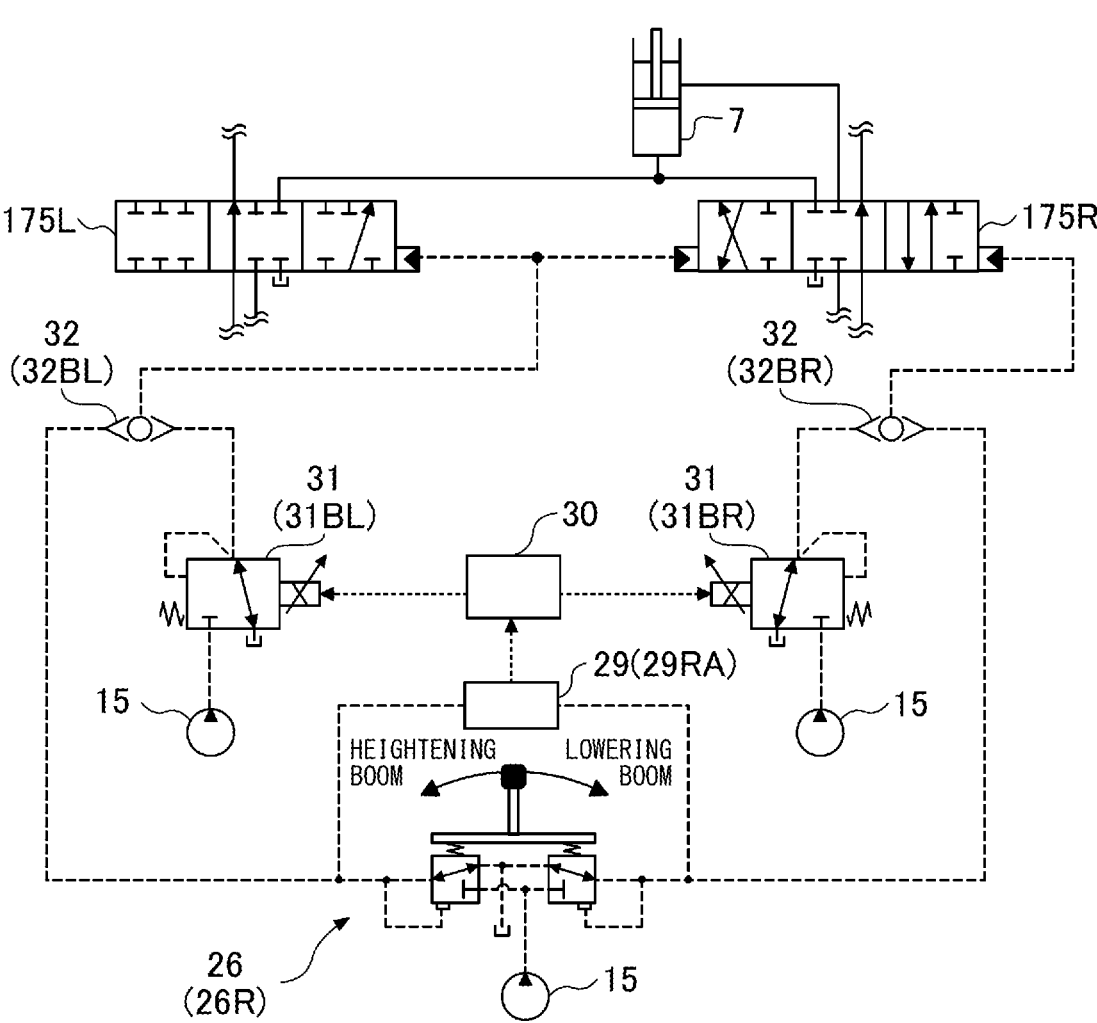
FIG. 4B is a view of a part of a hydraulic system for operating a boom cylinder.
Figure 4C:
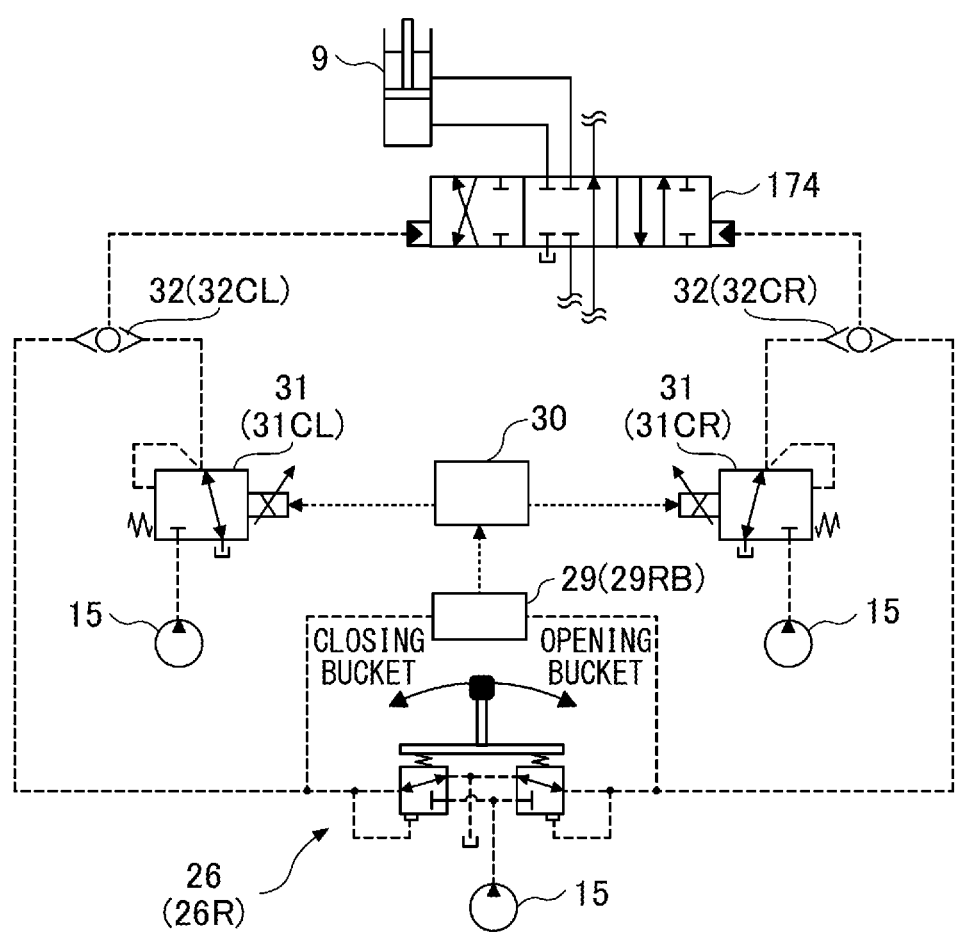
FIG. 4C is a view of a part of a hydraulic system for operating a bucket cylinder.
Figure 4D:
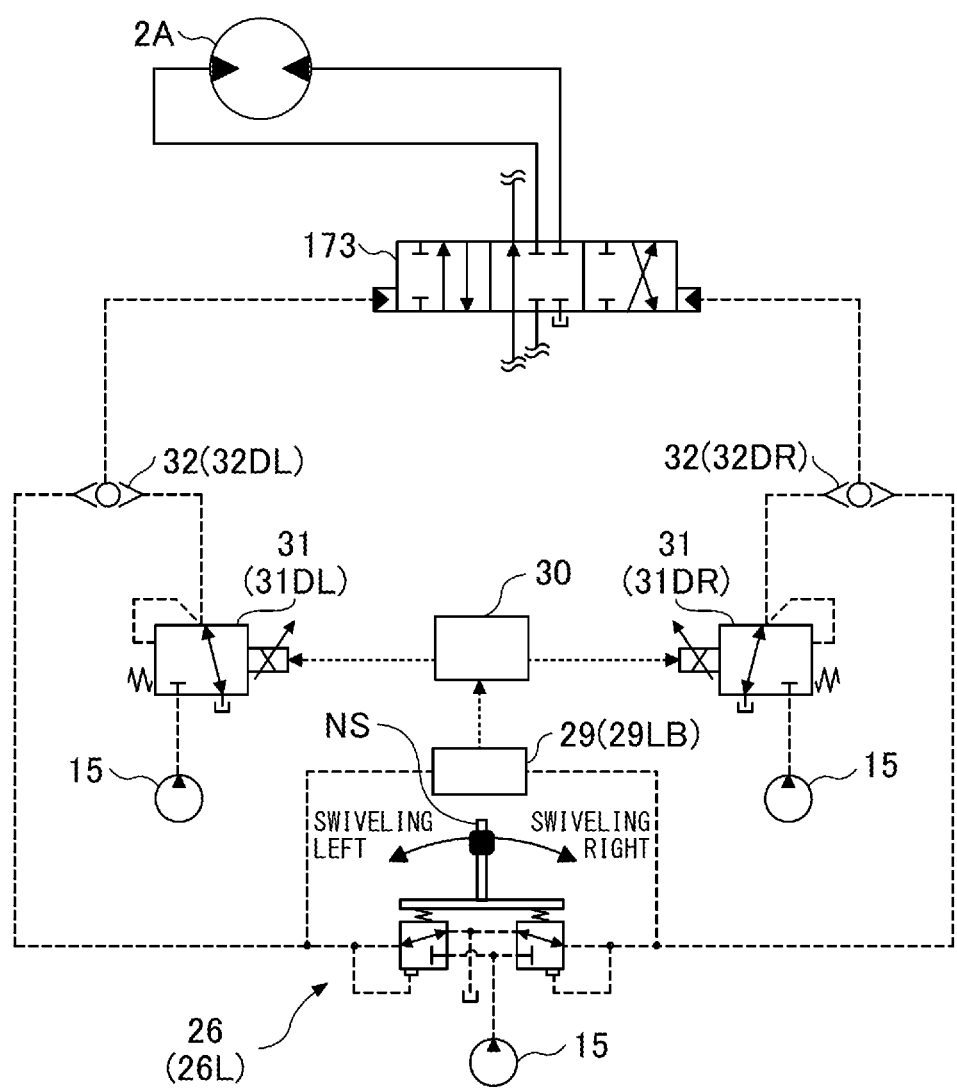
FIG. 4D is a view of a part of a hydraulic system for operating a swiveling hydraulic motor.
Figure 5A:
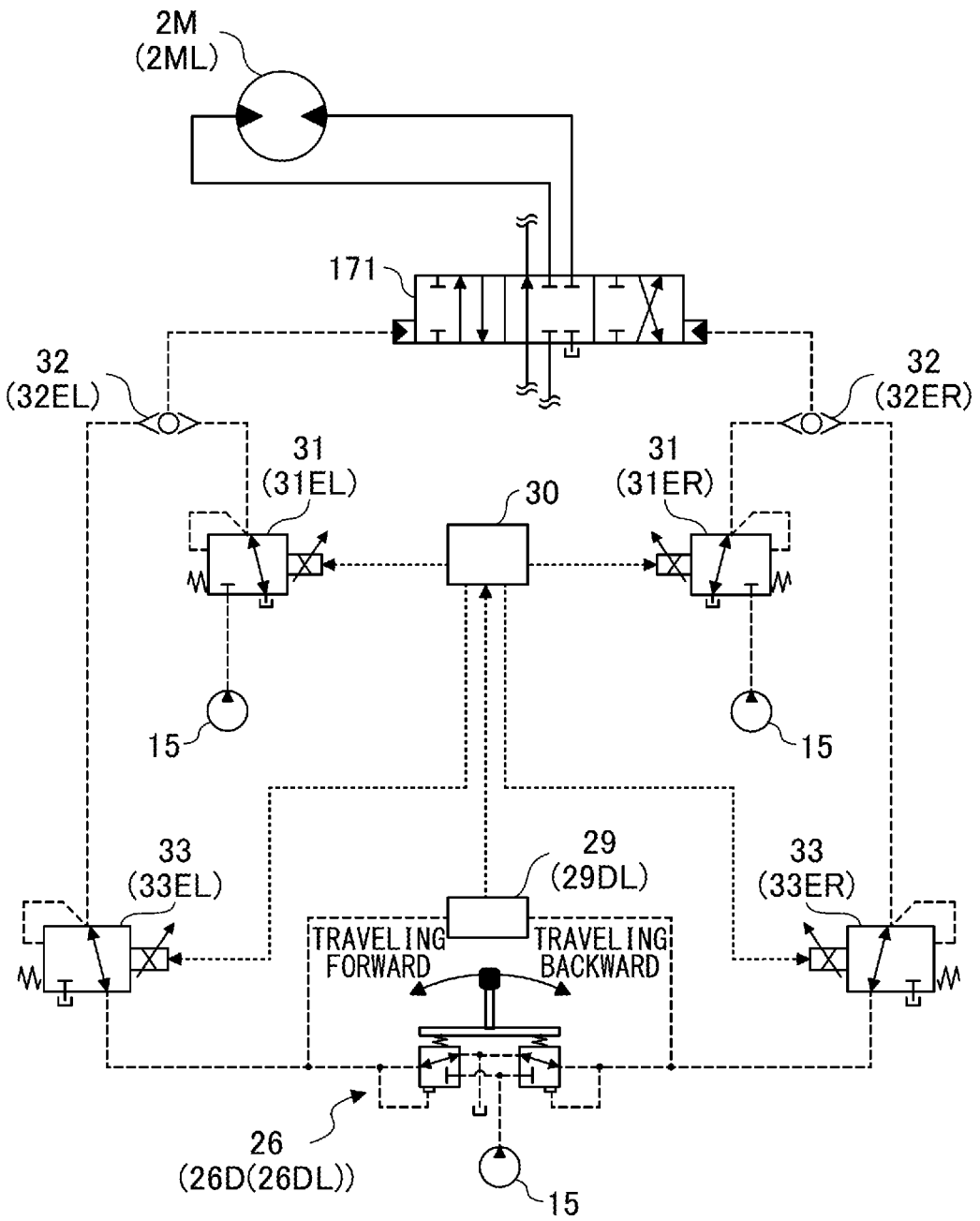
FIG. 5A is a view of a part of a hydraulic system for operating a left traveling hydraulic motor.
Figure 5B:
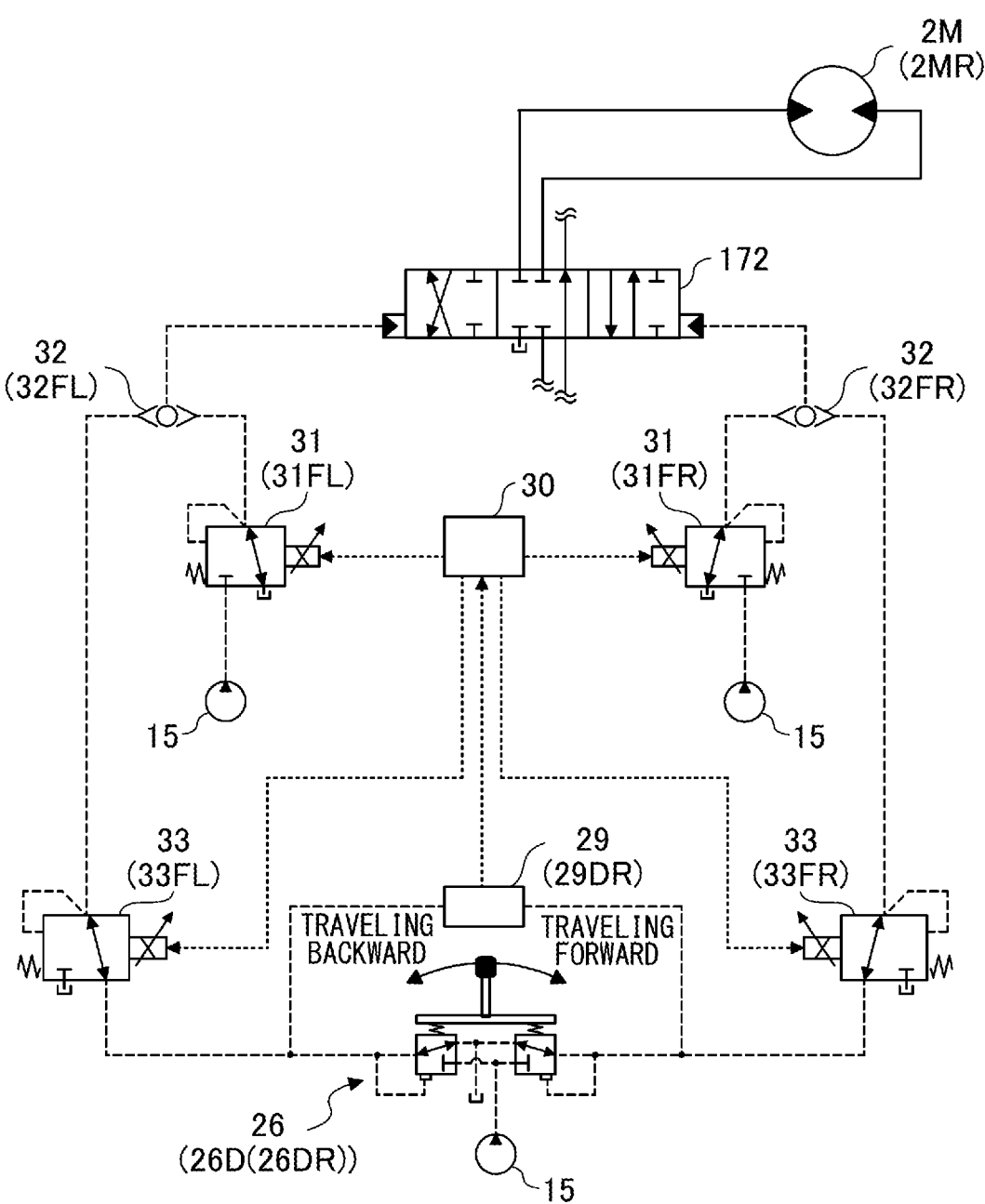
FIG. 5B is a view of a part of a hydraulic system for operating a right traveling hydraulic motor.

Referring now to FIGS. 4A-4D, 5A and 5B, a configuration for controllers 30 to operate actuators by machine control functions will be described. FIGS. 4A-4D and 5A-5B are views of a portion of a hydraulic system. Specifically, FIG. 4A illustrates a part of the hydraulic system for operation of the arm cylinder 8, and FIG. 4B illustrates a part of the hydraulic system for operation of the boom cylinder 7. FIG. 4C illustrates a part of the hydraulic system for operation of the bucket cylinder 9, and FIG. 4D illustrates a part of the hydraulic system for operation of the swivel hydraulic motor 2A. FIG. 5A illustrates a part of the hydraulic system for the operation of a left traveling hydraulic motor 2ML, and FIG. 5B is a diagram of a portion of the hydraulic system for the operation of a right traveling hydraulic motor 2MR.

As illustrated in FIGS. 4A-4D and 5A-5B, the hydraulic system includes a proportional valve 31, a shuttle valve 32, and a proportional valve 33. The proportional valve 31 includes proportional valves 31AL-31FL and 31AR-31FR, the shuttle valve 32 includes shuttle valves 32AL-32FL and 32AR-32FR, and the proportional valve 33 includes proportional valves 33AL-33FL and 33AR-33FR.

The proportional valve 31 functions as a control valve for a machine control. The proportional valve 31 is disposed in a pipe connecting the pilot pump 15 and the shuttle valve 32 and is configured to change the flow path area of the line. In this embodiment, the proportional valve 31 operates in response to a control command output by the controller 30. Thus, the controller 30 can supply the hydraulic oil discharged by the pilot pump 15 to the corresponding pilot port of the control valve in the control valve 17 via the proportional valve 31 and shuttle valve 32, regardless of the operator's operation of the operation device 26.

The shuttle valve 32 has two inlet ports and one outlet port. One of the two inlet ports is connected to the operation device 26 and the other is connected to the proportional valve 31. The outlet port is connected to a corresponding pilot port of control valve inside the control valve 17. Thus, the shuttle valve 32 can cause the higher of the pilot pressure generated by the operation device or the pilot pressure generated by the proportional valve 31 to act on the corresponding pilot port of the control valve.

The proportional valve 33 functions as a control valve for controlling a machine, as well as the proportional valve 31. The proportional valve 33 is disposed in the tube connecting the operation device 26 and shuttle valve 32 and is configured to change the flow path area of the line. Within this embodiment, the proportional valve 33 operates in response to control commands output by the controller 30. Therefore, the controller 30 can reduce the pressure of the hydraulic oil discharged by the operation device 26 regardless of the operation of the operation device 26 by an operator and supply the hydraulic oil to the pilot port of the corresponding control valve in the control valve 17 through the shuttle valve 32.

With this configuration, the controller 30 may operate a hydraulic actuator corresponding to the specific operation device 26 even if no operation is performed on the specific operation device 26. The controller 30 may also forcibly stop the operation of the hydraulic actuator corresponding to the specific operation device 26 even when the operation is performed for the specific operation device 26.

For example, as illustrated in FIG. 4A, the left operation lever 26L is used to operate the arm 5. Specifically, the left operation lever 26L utilizes hydraulic oil discharged by the pilot pump 15 to apply a pilot pressure to the pilot port of the control valve 176 in response to operation in the forward and backward directions. More specifically, the left operation lever 26L acts on the right pilot port of the control valve 176L and the left pilot port of the control valve 176R in accordance with the operation amount when operated in the arm retracting direction (backward direction). When the left operation lever 26L is operated in the arm opening direction (forward direction), the left operation lever 26L acts on the left pilot port of the control valve 176L and the right pilot port of the control valve 176R in accordance with the operation amount.

The left operation lever 26L is provided with a switch NS. Within this embodiment, the switch NS is a push-button switch. The operator can operate the left operation lever 26L while pressing the switch NS. The switch NS may be provided on the right operation lever 26R or at other locations within the cabin 10.

The operation pressure sensor 29LA detects the content of the operation in the forward and backward directions by the operator relative to the left operation lever 26L in the form of pressure and outputs the detected value to the controller 30.

The proportional valve 31AL operates in response to an electric current command output by the controller 30. The pressure of the hydraulic oil introduced from the pilot pump 15 to the right pilot port of the control valve 176L and the left pilot port of the control valve 176R through the proportional valve 31AL and shuttle valve 32AL is then adjusted. The proportional valve 31AR operates in response to the electric current command output by the controller 30. The pressure of the hydraulic oil introduced from the pilot pump 15 through the proportional valve 31AR and the shuttle valve 32AR into the left pilot port of the control valve 176L and the right pilot port of the control valve 176R is then adjusted. The proportional valves 31AL and 31AR can adjust the pilot pressure so that the control valves 176L and 176R can be stopped at any valve position.

This configuration allows the controller 30 to supply the hydraulic oil discharged by the pilot pump 15 to the right pilot port of the control valve 176L and the left pilot port of the control valve 176R through the proportional valve 31AL and the shuttle valve 32AL, regardless of the arm retracting operation by the operator. Said differently, the arm 5 can be fully retracted. The controller 30 may also supply the hydraulic oil discharged by the pilot pump 15 to the left pilot port of the control valve 176L and the right pilot port of the control valve 176R through the proportional valve 31AR and shuttle valve 32AR, regardless of an arm extending operation by the operator. Said differently, the arm 5 can be fully extended.

Also, as illustrated in FIG. 4B, the right operation lever 26R is used to operate the boom 4. Specifically, the right operation lever 26R utilizes the hydraulic oil discharged by the pilot pump 15 to apply a pilot pressure to the pilot port of the control valve 175 in response to an operation in the forward and backward directions. More specifically, the right operation lever 26R acts on the right pilot port of the control valve 175L and the left pilot port of the control valve 175R corresponding to the operation amount when operated in a boom heightening direction (backward direction). When the right operation lever 26R is operated in a boom lowering direction (forward direction), the pilot pressure corresponding to the operation amount is applied to the right pilot port of the control valve 175R.

The operation pressure sensor 29RA detects the content of the operator's operation using the to the right operation lever 26R in the forward and backward directions in the form of pressure and outputs a detected value to the controller 30.

The proportional valve 31BL operates in response to the electric current command output by the controller 30. The pilot pressure of the hydraulic oil introduced from the pilot pump 15 through the proportional valve 31BL and the shuttle valve 32BL into the right pilot port of the control valve 175L and the left pilot port of the control valve 175R is then adjusted. The proportional valve 31BR operates in response to the electric current command output by the controller 30. The pilot pressure of the hydraulic oil introduced from the pilot pump 15 through the proportional valve 31BR and the shuttle valve 32BR into the left pilot port of the control valve 175L and the right pilot port of the control valve 175R is then adjusted. The proportional valves 31BL and 31BR can adjust the pilot pressure so that the control valves 175L and 175R can be stopped at any valve position.

This structure allows the controller 30 to supply the hydraulic oil discharged by the pilot pump 15 to the right pilot port of the control valve 175L and the left pilot port of the control valve 175R through the proportional valve 31BL and shuttle valve 32BL, regardless of the operator's boom heightening operation. Said differently, the boom 4 can be heightened. The controller 30 may also supply the hydraulic oil discharged by the pilot pump 15 to the right pilot port of the control valve 175R through the proportional valve 31BR and the shuttle valve 32BR regardless of the boom lowering operation by the operator. Said differently, the boom 4 can be lowered.

As illustrated in FIG. 4C, the right operation lever 26R is also used to operate the bucket 6. Specifically, the right operation lever 26R utilizes the hydraulic oil discharged by the pilot pump 15 to apply a pilot pressure to the pilot port of the control valve 174 corresponding to the operation in the leftward and rightward directions. More specifically, the right operation lever 26R causes the pilot pressure, corresponding to the operation amount, to be applied to the left pilot port of the control valve 174 when the right operation lever 26R is operated in the bucket closing direction (left direction). The right operation lever 26R, when right operation lever 26R operated in the bucket opening direction (right direction), causes the pilot pressure corresponding to the operation amount to act on the right pilot port of the control valve 174.

The operation pressure sensor 29RB detects the content of the operator's operation of the right operation lever 26R in the leftward and rightward directions in the form of pressure and outputs the detected value to the controller 30.

The proportional valve 31CL operates in response to the electric current command output by the controller 30. The pilot pressure is then adjusted by the hydraulic oil introduced from the pilot pump 15 to the left pilot port of the control valve 174 through the proportional valve 31 CL and shuttle valve 32 CL. The proportional valve 31CR operates in response to the electric current command output by the controller 30. The pilot pressure is then adjusted by the hydraulic oil introduced from the pilot pump 15 to the right pilot port of the control valve 174 via the proportional valve 31CR and the shuttle valve 32CR. The proportional valves 31CL and 31CR can adjust the pilot pressure so that the control valve 174 can be stopped at an arbitrary valve position.

This structure allows the controller 30 to supply the hydraulic oil discharged by the pilot pump 15 to the left pilot port of the control valve 174 via the proportional valve 31CL and shuttle valve 32CL, regardless of the operator's bucket closing operation. Said differently, the bucket 6 can be closed. The controller 30 may also supply the hydraulic oil discharged by the pilot pump 15 to the right pilot port of the control valve 174 through the proportional valve 31CR and the shuttle valve 32CR regardless of the operator's bucket opening operation. Said differently, the bucket 6 can be opened.

As illustrated in FIG. 4D, the left operation lever 26L is also used to operate the swiveling mechanism 2. Specifically, the left operation lever 26L utilizes the hydraulic oil discharged by the pilot pump 15 to apply a pilot pressure to the pilot port of the control valve 173 in accordance with the operation in the leftward and rightward directions. More specifically, the left operation lever 26L causes the pilot pressure corresponding to the operation amount to be actuated on the left pilot port of the control valve 173 when the left operation lever 26L is operated in the left swiveling direction (left direction). When the left operation lever 26L is operated in the right swiveling direction (right direction), the pilot pressure corresponding to the operation amount is applied to the right pilot port of the control valve 173.

The operation pressure sensor 29LB detects the content of the operation in the leftward and rightward directions relative to the left operation lever 26L by the operator in the form of pressure and outputs the detected value to the controller 30.

The proportional valve 31DL is operated in response to the electric current command output by the controller 30. The pilot pressure is then adjusted by the hydraulic oil introduced from the pilot pump 15 to the left pilot port of the control valve 173 through the proportional valve 31DL and shuttle valve 32DL. The proportional valve 31DR operates in response to the electric current command output by the controller 30. The pilot pressure is then adjusted by the hydraulic oil introduced from the pilot pump 15 to the right pilot port of the control valve 173 via the proportional valve 31DR and the shuttle valve 32DR. The proportional valve 31DL and 31DR can adjust the pilot pressure so that control valve 173 can be stopped at any valve position.

This structure allows the controller 30 to supply the hydraulic oil discharged by the pilot pump 15 to the left pilot port of the control valve 173 through the proportional valve 31DL and shuttle valve 32DL regardless of the operator's left swiveling operation. Said differently, the swiveling mechanism 2 can swivel left. The controller 30 may also supply the hydraulic oil discharged by the pilot pump 15 to the right pilot port of the control valve 173 via the proportional valve 31DR and the shuttle valve 32DR regardless of the operator's right turn operation. Said differently, the swiveling mechanism 2 can swivel right.

Also, as illustrated in FIG. 5A, the left traveling lever 26DL is used to operate the left crawler 1CL. Specifically, the left traveling lever 26DL utilizes hydraulic oil discharged by the pilot pump 15 to apply a pilot pressure to the pilot port of the control valve 171 corresponding to the operation in the forward and backward directions. More specifically, the left traveling lever 26DL, when operated in the traveling forward direction (forward direction), causes the pilot pressure to act on the left pilot port of the control valve 171 in accordance with the operation amount. When the left traveling lever 26DL is operated in the backward traveling direction (the backward direction), the pilot pressure is applied to the right pilot port of the control valve 171 according to the operation amount.

The operation pressure sensor 29DL detects the content of the operator's operation of the left traveling lever 26DL in the forward and backward directions in the form of pressure and outputs the detected value to the controller 30.

The proportional valve 31EL operates in response to the electric current command output by the controller 30. The pilot pressure is then adjusted by the hydraulic oil introduced from the pilot pump 15 to the left pilot port of the control valve 171 via the proportional valve 31EL and shuttle valve 32EL. The proportional valve 31ER operates in response to the electric current command output by the controller 30. The pilot pressure is then adjusted by the hydraulic oil introduced from the pilot pump 15 to the right pilot port of the control valve 171 via the proportional valve 31ER and the shuttle valve 32ER. The proportional valves 31EL and 31ER can adjust the pilot pressure so that the control valve 171 can be stopped at any valve position.

This structure allows the controller 30 to supply the hydraulic oil discharged by the pilot pump 15 to the left pilot port of the control valve 171 through the proportional valve 31EL and shuttle valve 32EL, regardless of the forward left traveling operation by the operator. Said differently, the left crawler 1CL is made travel forward. The controller 30 may also supply the hydraulic oil discharged by the pilot pump 15 to the right pilot port of the control valve 171 through the proportional valve 31ER and shuttle valve 32ER regardless of the left traveling backward operation by the operator. Said differently, the left crawler 1CL can be caused to travel backward.

The proportional valve 33EL operates in response to the control command (electric current command) output by the controller 30. The pilot pressure is then decreased by the hydraulic oil introduced from the pilot pump 15 to the left pilot port of the control valve 171 via the left traveling lever 26DL, the proportional valve 33EL and the shuttle valve 32EL. The proportional valve 33ER operates in response to the control command (electric current command) output by the controller 30. The pilot pressure is then decreased by the hydraulic oil introduced from the pilot pump 15 to the right pilot port of the control valve 172 via the left traveling lever 26DL, the proportional valve 33ER and the shuttle valve 32ER. The proportional valves 33EL and 33ER can adjust the pilot pressure so that the control valve 171 can be stopped at any valve position.

With this configuration, the controller 30 can depressurize the pilot pressure acting on the left pilot port of the control valve 171 and can forcibly stop the left forward operation of the lower traveling body 1 as necessary, even when the left forward operation by the operator is being performed. The same applies to the case where the left backward operation of the lower traveling body 1 is forcibly stopped when left backward operation by the operator is being performed.

Alternatively, the controller 30 may control the proportional valve 31ER as necessary, even when left forward operation is performed by an operator, and may increase the pilot pressure acting on the right pilot port of the control valve 171 opposite the left pilot port of the control valve 171, thereby forcibly stopping the left forward operation of the lower traveling body 1 by forcing the control valve 171 to return to the neutral position. In this case, the proportional valve 33EL may be omitted. The same applies to the case where the left backward operation of the lower traveling body 1 is forcibly stopped when the left backward operation by the operator is performed.

As illustrated in FIG. 5B, the right traveling lever 26DR is used to operate the right crawler 1CR. Specifically, the right traveling lever 26DR utilizes the hydraulic oil discharged by the pilot pump 15 to apply a pilot pressure to the pilot port of the control valve 172 in response to the operation in the forward and backward directions. More specifically, the right traveling lever 26DR, when actuated in the forward direction, causes the pilot pressure to act on the right pilot port of the control valve 172 in accordance with the operation amount. When the right traveling lever 26DR is operated in the backward traveling direction (backward direction), the pilot pressure is applied to the left pilot port of the control valve 172 according to the operation amount.

The operation pressure sensor 29DR detects the content of the operation in the forward and backward directions relative to the right traveling lever 26DR by the operator in the form of pressure and outputs the detected value to the controller 30.

The proportional valve 31FL operates in response to the electric current command output by the controller 30. The pilot pressure is then adjusted by the hydraulic oil introduced from the pilot pump 15 to the left pilot port of the control valve 172 via the proportional valve 31FL and the shuttle valve 32FL. The proportional valve 31FR operates in response to the electric current command output by the controller 30. The pilot pressure is then adjusted by the hydraulic oil introduced from the pilot pump 15 to the right pilot port of the control valve 172 via the proportional valve 31FR and the shuttle valve 32FR. The proportional valves 31FL and 31FR can adjust the pilot pressure so that the control valve 172 can be stopped at any valve position.

This configuration allows the controller 30 to supply the hydraulic oil discharged by the pilot pump 15 to the right pilot port of the control valve 172 via the proportional valve 31FL and shuttle valve 32FL regardless of the operator's right forward traveling operation. Said differently, the right crawler 1CR is made travel forward. The controller 30 may also supply the hydraulic oil discharged by the pilot pump 15 to the left pilot port of the control valve 172 via the proportional valve 31FR and the shuttle valve 32FR regardless of the right traveling backward operation by the operator. Said differently, the right crawler 1CR is made travel backward.

The proportional valve 33FL operates in response to the control command (electric current command) output by the controller 30. The pilot pressure is then decreased by the hydraulic oil introduced from the pilot pump 15 to the left pilot port of the control valve 172 via the right traveling lever 26DR, the proportional valve 33FL and the shuttle valve 32FL. The proportional valve 33FR operates in response to the control command (electric current command) output by the controller 30. The pilot pressure is then decreased by the hydraulic oil introduced from the pilot pump 15 to the right pilot port of the control valve 172 via the right traveling lever 26DR, the proportional valve 33FR and the shuttle valve 32FR. The proportional valves 33FL and 33FR can adjust the pilot pressure so that the control valve 172 can be stopped at any valve position.

With this configuration, the controller 30 can depressurize the pilot pressure acting on the right pilot port of the control valve 172 and can forcibly stop the right forward operation of the lower traveling body 1 as necessary, even when the left forward operation by the operator is being performed. The same applies to the case where the right backward operation of the lower traveling body 1 is forcibly stopped when the right backward operation by the operator is being performed.

Alternatively, the controller 30 may control the proportional valve 31FR as necessary, even when left forward operation is performed by an operator, and may increase the pilot pressure acting on the left pilot port of the control valve 172 opposite the right pilot port of the control valve 172, thereby forcibly stopping the right forward operation of the lower traveling body 1 by forcing the control valve 171 to return to the neutral position. In this case, the proportional valve 33FR may be omitted. The same applies to the case where the right backward operation of the lower traveling body 1 is forcibly stopped when the right backward operation by the operator is performed.

Figure 6:
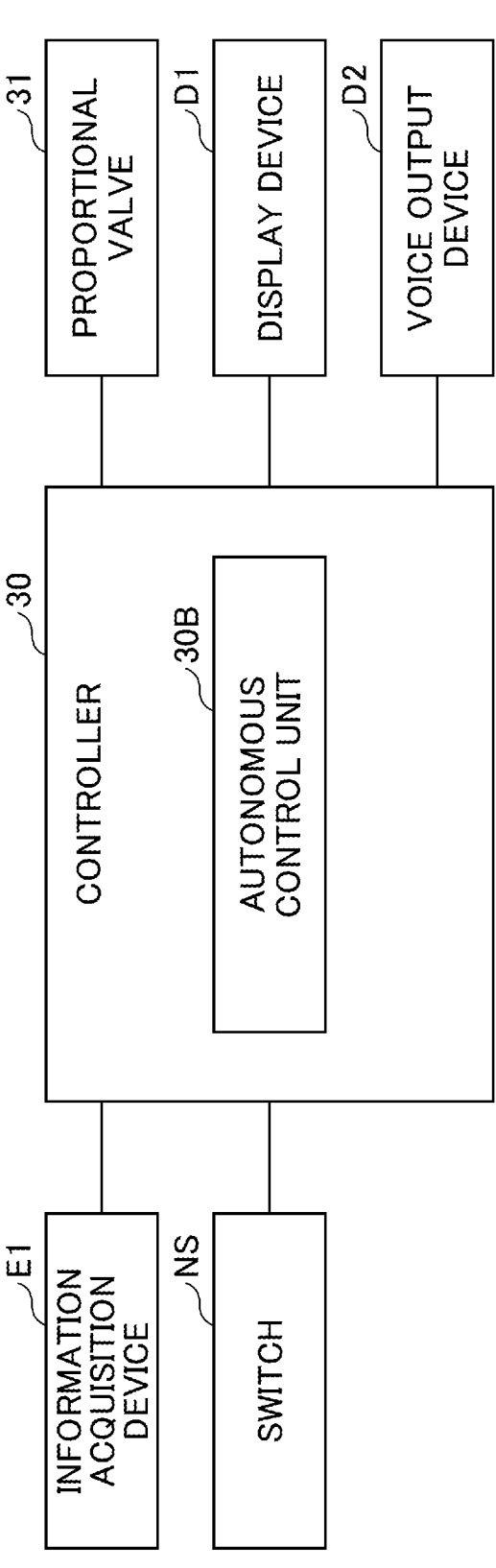
FIG. 6 is a functional block diagram of a controller.

Next, the function of the controller 30 will be described with reference to FIG. 6. FIG. 6 is a functional block diagram of the controller 30. In the example of FIG. 6, the controller 30 is configured to receive a signal output by at least one of the information acquisition device E1 and the switch NS, perform various operations, and output control commands to at least one of the proportional valve 31, the display device D1, and the voice output device D2.

The information acquisition device E1 detects information about the shovel 100. In this embodiment, the information acquisition device E1 includes at least one of a boom angle sensor S1, an arm angle sensor S2, a bucket angle sensor S3, an body inclination sensor S4, a swivel angular velocity sensor S5, a boom rod pressure sensor, a boom bottom pressure sensor, an arm rod pressure sensor, an arm bottom pressure sensor, a bucket rod pressure sensor, a bucket bottom pressure sensor, a boom cylinder stroke sensor, an arm cylinder stroke sensor, a bucket cylinder stroke sensor, a discharge pressure sensor 28, an operation pressure sensor 29, a space recognition device 70, a direction detection device 71, an information input device 72, a positioning device 73, and a communication device. For example, the information acquisition device E1 acquires at least one of information regarding the shovel 100, such as a boom angle, an arm angle, a bucket angle, a body inclination angle, a swivel angle, a boom rod pressure, a boom bottom pressure, an arm rod pressure, an arm bottom pressure, a bucket rod pressure, a bucket bottom pressure, a boom stroke amount, an arm stroke amount, a bucket stroke amount, a discharge pressure of the main pump 14, an operation pressure of the operation device 26, information regarding an object present in a three-dimensional space around the shovel 100, information regarding a relative relationship between the direction of the upper swiveling body 3 and the direction of the lower traveling body 1, information input to the controller 30, and information regarding the present position. The information acquisition device E1 may also acquire information from another machine such as a construction machine or a flying object. The flying object can be, for example, a multi-copter, an airship or the like that obtains information about a work site.

The controller 30 includes an autonomous control unit 30B as a functional element. The autonomous control unit 30B may be formed by hardware or software.

The autonomous control unit 30B is configured to be able to autonomously control the shovel 100 regardless of the presence or absence of operation by an operator.

In this embodiment, the autonomous control unit 30B can operate the hydraulic actuator autonomously by outputting a control command to the proportional valve 31 when a predetermined start condition is satisfied.

In this embodiment, the autonomous control unit 30B can operate the actuator autonomously by providing the electric current command to the proportional valve 31 and individually adjusting the pilot pressure acting on the control valve corresponding to the actuator. For example, the boom cylinder 7 can be operated regardless of whether the right operation lever 26R is tilted in a forward and backward direction, and the arm cylinder 8 can be operated regardless of whether the left operation lever 26L is tilted in the forward and backward direction. Similarly, the left traveling hydraulic motor 2ML can be operated regardless of whether the left traveling pedal has been stepped on, and the right traveling hydraulic motor 2MR can be operated regardless of whether the right traveling pedal has been folded. The same applies to the swiveling hydraulic motor 2A concerning the left operation lever 26L, bucket cylinder 9 concerning the right operation lever 26, the left traveling hydraulic motor 2ML concerning the left operation lever 26DL, and the right traveling hydraulic motor 2MR concerning the right traveling lever 26DR.

Specifically, as illustrated in FIG. 4B, the autonomous control unit 30B is configured to output the electric current command to the proportional valve 31BL to adjust the pilot pressure acting on the right pilot port of the control valve 175L and the pilot pressure acting on the left pilot port of the control valve 175R. Because of this configuration, the autonomous control unit 30B can generate the same pilot pressure as when the right operation lever 26R is actually operated in the boom-up direction even when the right operation lever 26R is not operated in the boom-up direction, thereby extending the boom cylinder 7. The same applies to the case where the boom cylinder 7 is contracted. The same applies to the case where the arm cylinder 8 is extended; the bucket cylinder 9 is extended; and the traveling hydraulic motor 2M is rotated.

When the hydraulic actuator is operated autonomously, the autonomous control unit 30B may output a control command to at least one of the display device D1 and the voice output device D2 to inform the operator that the hydraulic actuator is operated autonomously.

Figure 7:
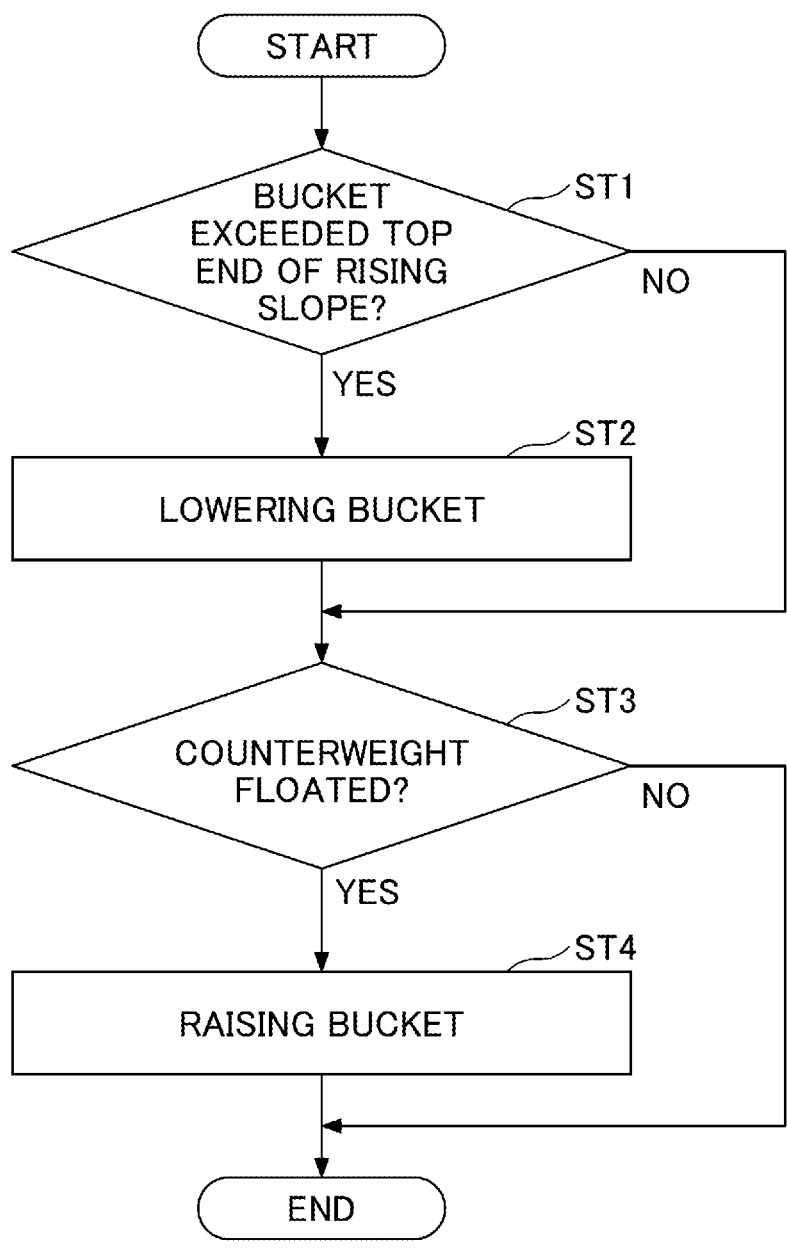
FIG. 7 is a flowchart of a first autonomous control process.

Next, an example of a process in which the autonomous control unit 30B autonomously controls the shovel 100 will be described with reference to FIGS. 7, 8A to 8C, and 9A to 9D. FIG. 7 is a flowchart of a process in which the autonomous control unit 30B autonomously controls an attitude of the excavation attachment AT of the shovel 100 ascending a slope (hereinafter referred to as the "first autonomous control process"). The autonomous control unit 30B repeatedly performs this first autonomous control process with a predetermined control cycle while the shovel 100 is ascending a slope. For example, the autonomous control unit 30B determines whether the shovel 100 is traveling based on the output of the operation pressure sensors 29DL and 29DR and determines whether the shovel 100 is positioned on a slope based on the output of the body inclination sensor S4.

If it is determined that the shovel 100 is positioned on a substantially horizontal plane, that is, if it is determined that the shovel 100 is not positioned on a rising plane, the autonomous control unit 30B may stop executing the first autonomous control process. When the attachment actuator is moved through the manual operation of the control device 26, the autonomous control unit 30B may stop executing the first autonomous control process to prioritize the movement of the attachment actuator based on manual operation.

When the shovel 100 ascends a slope, the autonomous control unit 30B extends the attachment actuator so that the position of the excavation attachment AT is a predetermined slope position. Therefore, in a climbing position, the attachment is raised and the center of gravity of the shovel 100 is raised. Whether to climb may be determined based on whether a slope greater than or equal to a predetermined angle continues for a predetermined distance. The autonomous control unit 30B may change the climbing attitude according to the size of the slope of the ascending slope or the like.

Figure 8A:
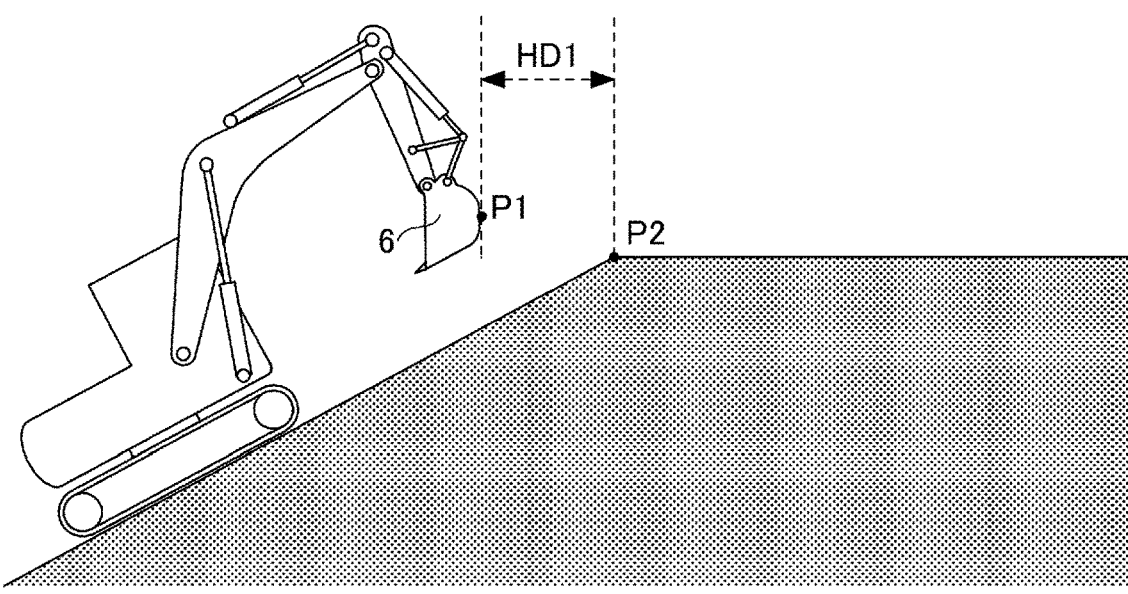
FIG. 8A is a side view of a shovel ascending a slope.
Figure 8B:
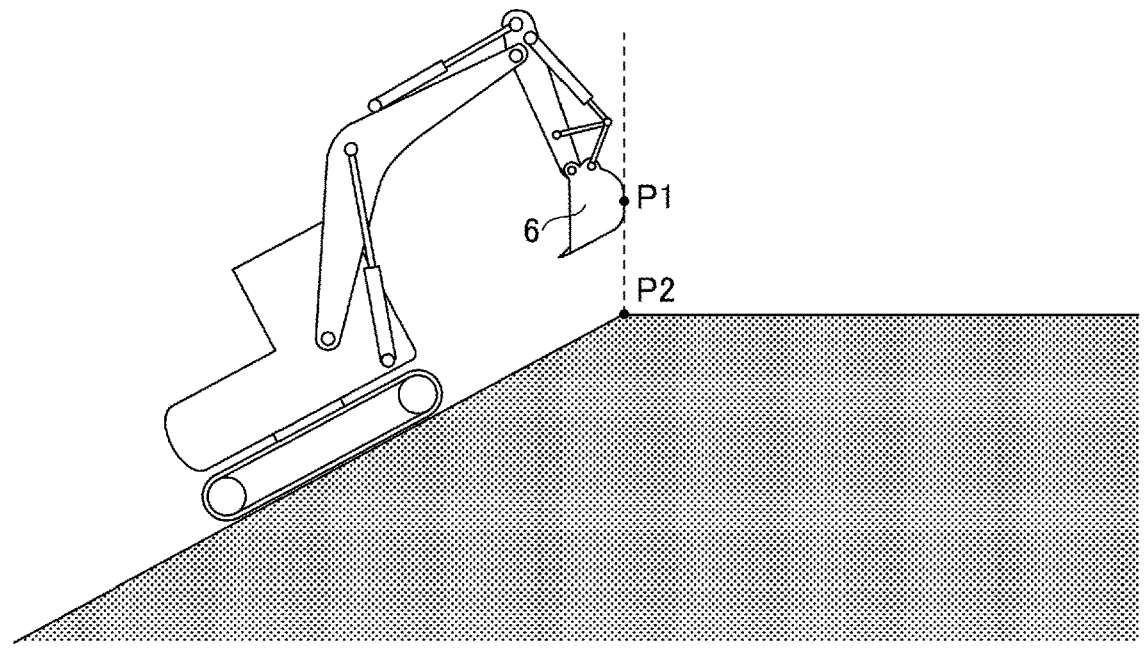
FIG. 8B is a side view of a shovel ascending a slope.
Figure 8C:
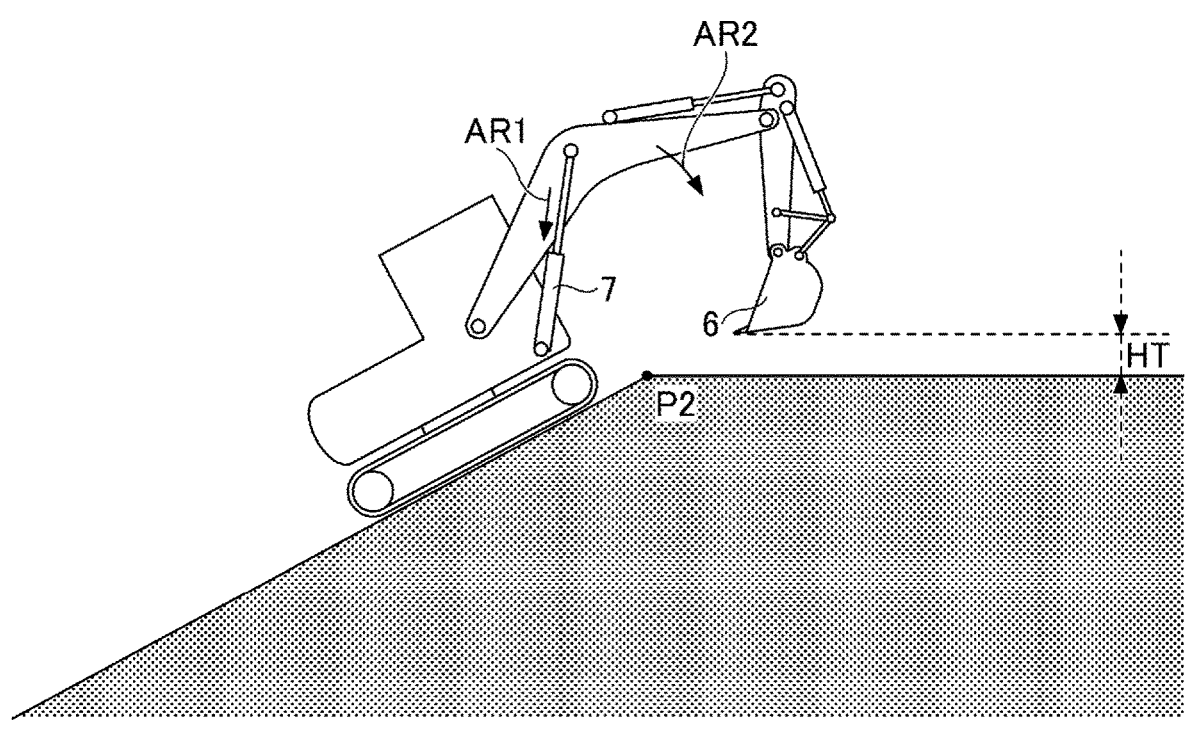
FIG. 8C is a side view of a shovel ascending a slope.

FIGS. 8A to 8C and 9A to 9D are side views of a shovel 100 traveling. FIGS. 8A to 8C, in the order of FIGS. 8A, 8B, and 8C, illustrate the movement of the shovel 100 until the shovel 100 reaches the upper end P2 of the slope. FIGS. 9A to 9D illustrate the movement of shovel 100 as the shovel 100 passes the upper end P2 of the slope in the order of FIGS. 9A, 9B, 9C, 9D.

First, in Step ST1, the autonomous control unit 30B determines whether a predetermined start condition has been met, that is, whether the bucket 6 has exceeded the upper end P2 of the slope. In this embodiment, the autonomous control unit 30B computes the horizontal distance (i.e., the horizontal distance measured perpendicular to the direction of gravity) HD1 between a predetermined point P1 on the bucket 6 and the upper end P2 of the slope, as illustrated in FIGS. 8A and 8B. The predetermined point P1 on the bucket 6 is, for example, a point on the bucket 6 that is the most anterior position in the direction of travel. Specifically, the autonomous control unit 30B calculates the horizontal distance HD1 based on the position of the upper end P2 derived from the output of the forward sensor 70F and the position of the predetermined point P1 derived from the output of the attitude detecting device. The horizontal distance HD1 may be calculated based on the position information acquired by the positioning device 73 or may be calculated based on the position information acquired by the space recognition device 70. As illustrated in FIG. 8A, when the horizontal distance HD1 is larger than a predetermined value (zero), the autonomous control unit 30B determines that the bucket 6 has not passed the upper end P2 of the slope. Meanwhile, as illustrated in FIG. 8B, when the horizontal distance HD1 is less than or equal to a predetermined value (zero), the autonomous control unit 30B determines that the bucket 6 has passed the upper end P2 of the slope.

If it is determined that the bucket 6 has not exceeded the upper end P2 of the upstream slope (NO in step ST1), the autonomous control unit 30B executes step ST3 without changing the attitude of the excavation attachment AT.

If it is determined that the bucket 6 has passed the upper end P2 of the upstream slope (YES of the step ST1), the autonomous control unit 30B moves the bucket 6 down (step ST2). This action causes the center of gravity of the shovel 100 to move downward. In this embodiment, as illustrated in FIG. 8C, the autonomous control unit 30B outputs a control command to the proportional valve 31 to contract the boom cylinder 7 (see the arrow AR1) and lowers the boom 4 (see the arrow AR2) so that the vertical distance (i.e., the vertical distance measured along the direction of gravity) between the bucket 6 and the ground reaches a predetermined value HT. The height of the bucket may be a vertical distance between the toe of the bucket 6 and the ground.

Thereafter, in Step ST3, the autonomous control unit 30B determines whether another starting condition has been satisfied, that is, whether the counterweight has floated. In this embodiment, the autonomous control unit 30B determines whether the counterweight has floated based on the output of the body inclination sensor S4. The autonomous control unit 30B may determine whether the counterweights have floated based on the output of other devices, such as the forward sensor 70F. Specifically, the autonomous control unit 30B continuously derives a change in pitch angle of the upper swiveling body 3 from the output of the body inclination sensor S4, and determines that the counterweight has floated when the change exceeds a predetermined value.

If it is determined that the counterweight does not float (NO in step ST3), the autonomous control unit 30B terminates the first autonomous control process without changing the attitude of the excavation attachment AT.

Figure 9A:
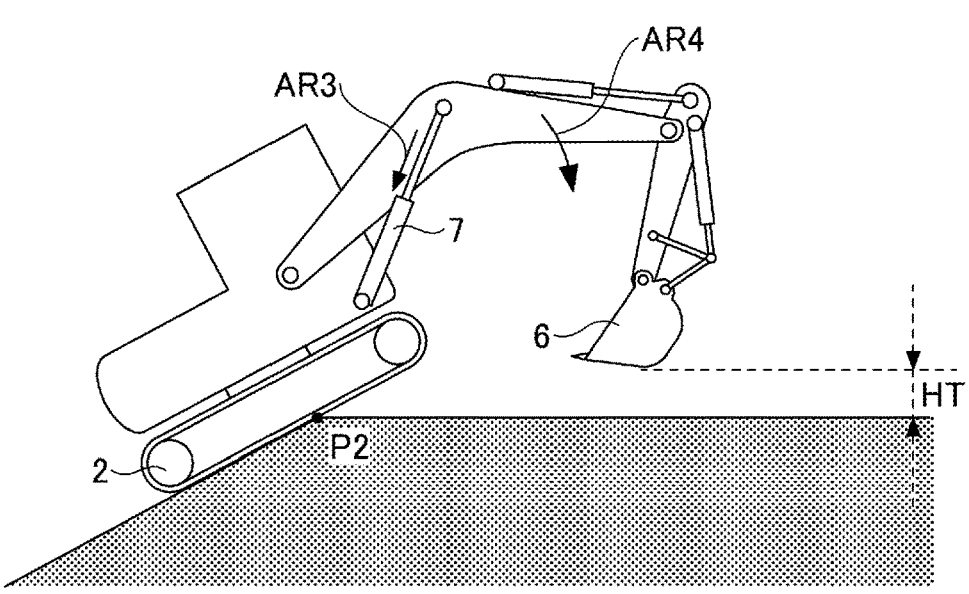
FIG. 9A is a side view of a shovel ascending a slope.
Figure 9B:
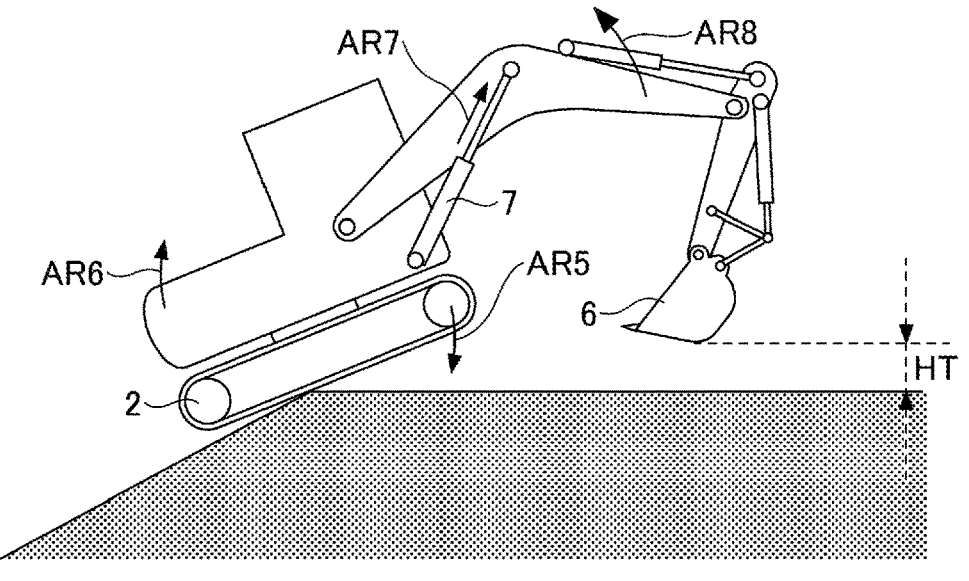
FIG. 9B is a side view of a shovel ascending a slope.

When it is determined that the counterweight has risen (YES in step ST3), the autonomous control unit 30B raises the bucket 6 (step ST4). In this embodiment, as illustrated in FIG. 9B, the autonomous control unit 30B outputs a control command to the proportional valve 31, extends the boom cylinder 7 (see the arrow AR7), and raises the boom 4 (see the arrow AR8) so that the bucket height reaches a predetermined value HT when the front end of the lower traveling body 1 protruding into the air is lowered (see the arrow AR5) and the counter weight rises (see the arrow AR6).

Figure 9C:
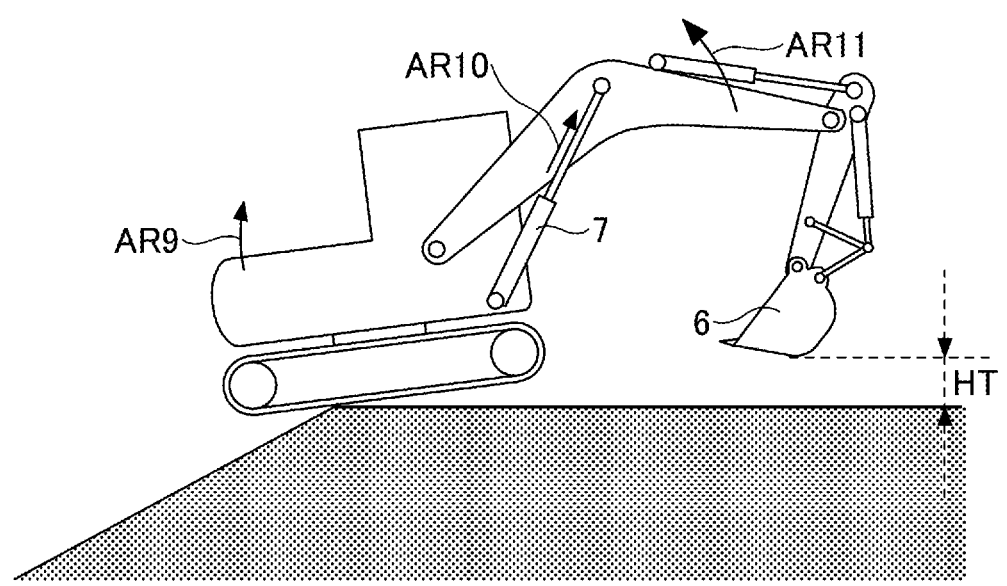
FIG. 9C is a side view of a shovel ascending a slope.

Similarly, as illustrated by the arrow AR9 of FIG. 9C, the autonomous control unit 30B extends the boom cylinder 7 (see the arrow AR10) and raises the boom 4 (see the arrow AR11) so that the bucket height reaches a predetermined value HT, even when the counterweight rises further as illustrated by the arrow AR9.

Figure 9D:
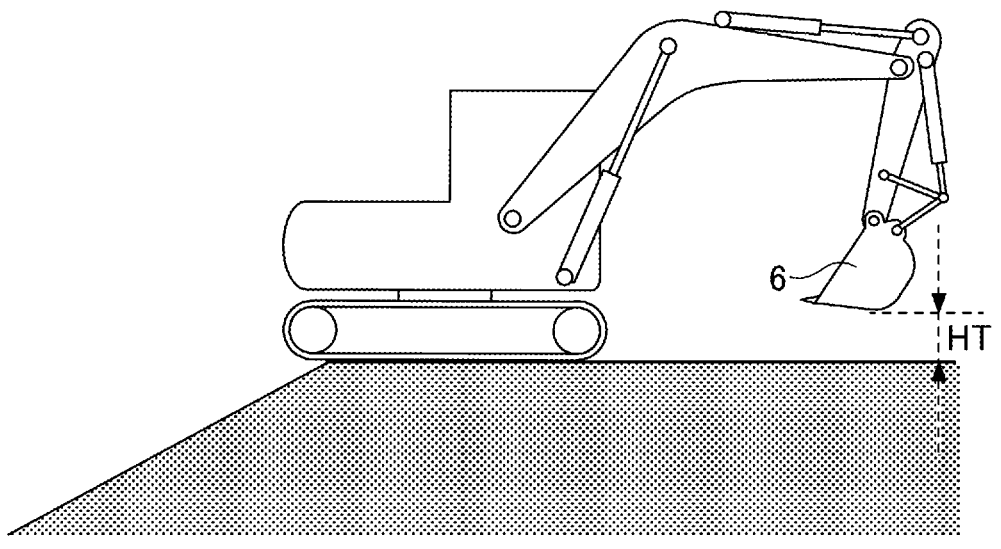
FIG. 9D is a side view of a shovel ascending a slope.

As a result, as illustrated in FIG. 9D, the autonomous control unit 30B can slowly land the shovel 100 on a horizontal plane ahead of the slope while inhibiting pitching of the shovel 100. The autonomous control unit 30B can compensate for the rotational moment that causes the counterweight to float by raising the bucket 6 and moving the center of gravity of the shovel 100 upward when the counterweight is raised.

As described above, as illustrated in FIG. 9A, the autonomous control unit 30B contracts the boom cylinder 7 and lowers the boom 4 so that the bucket height reaches the predetermined value HT even after the front end of the lower traveling body 1 has passed the upper end P2 of the upstream slope.

As illustrated in FIGS. 9B and 9C, the autonomous control unit 30B extends the boom cylinder 7 to raise the boom 4 even when it is determined that the counterweight is rising because the distal end of the lower traveling body 1 protruding into the air drops, so that the bucket height is a predetermined value HT.

The autonomous control unit 30B may raise and lower the boom 4 without determining whether the counterweight has floated. In this case, the autonomous control unit 30B may expand and contract the boom cylinder 7 so that the bucket height is maintained at a predetermined value HT based on, for example, the output of the forward sensor 70F. The autonomous control unit 30B may raise and lower the bucket 6 by extending and contracting the boom cylinder 7, by extending and contracting the arm cylinder 8, by extending and contracting the bucket cylinder 9, or a combination thereof.

With this configuration, the autonomous control unit 30B can prevent the shovel 100 from oscillating back and forth due to sudden changes in pitch angle of the shovel 100 due to the floating of the top of the lower traveling body 1 when the shovel 100 clears the upper end P2 of the slope.

Figure 10:
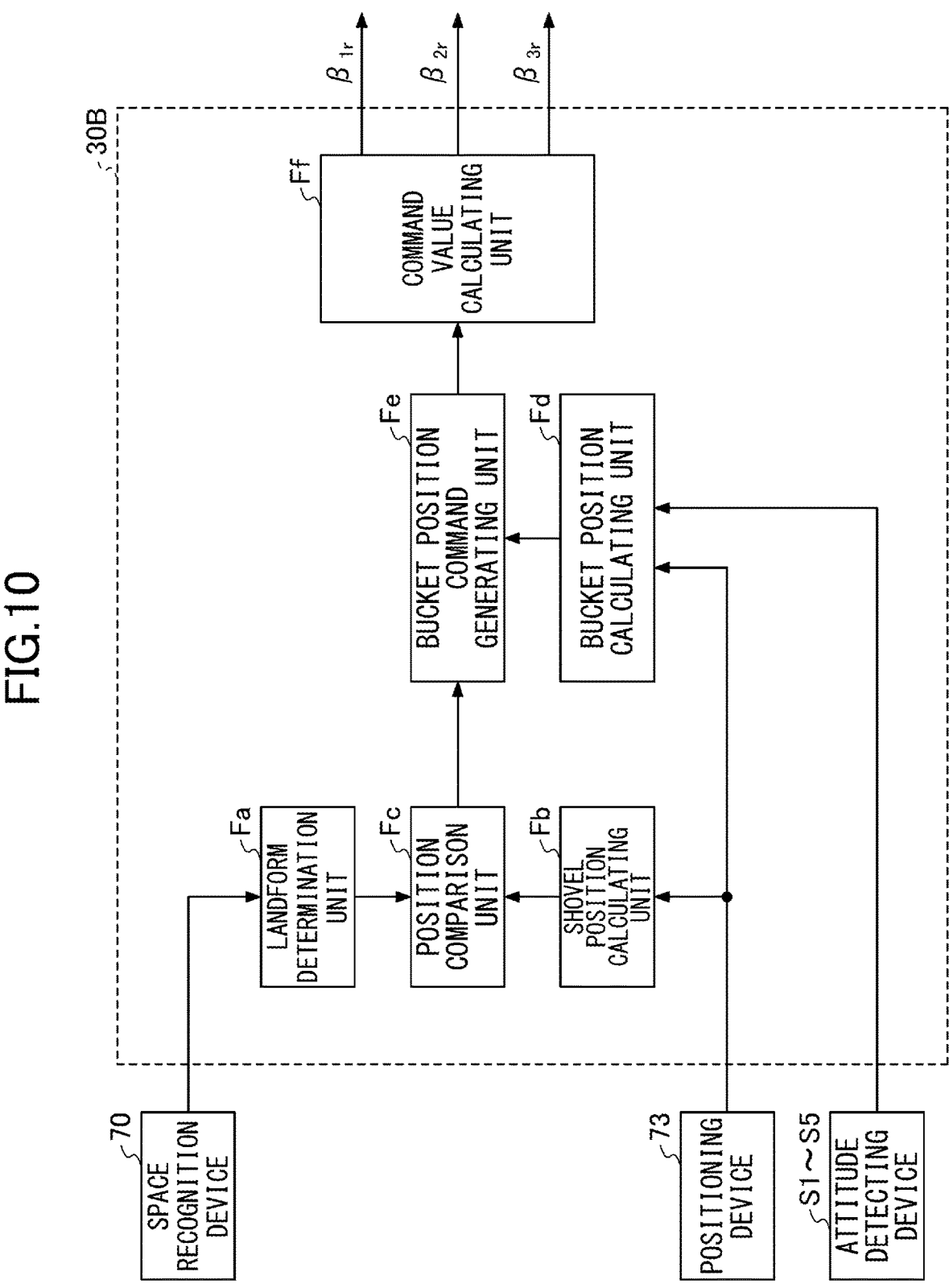
FIG. 10 is a block diagram illustrating an example of a configuration of an autonomous control unit.

Next, an example of a configuration of the autonomous control unit 30B will be described with reference to FIG. 10. FIG. 10 is a block diagram illustrating an example of a configuration of the autonomous control unit 30B. In the example illustrated in FIG. 10, the autonomous control unit 30B can achieve movement of the shovel 100 as illustrated in FIGS. 8A to 8C and 9A to 9D.

Specifically, the autonomous control unit 30B includes a landform determination unit Fa, a shovel position calculating unit Fb, a position comparison unit Fc, a bucket position calculating unit Fd, a bucket position command generating unit Fe, and a command value calculating unit Ff. The landform determination unit Fa, the shovel position calculating unit Fb, the position comparison unit Fc, the bucket position calculating unit Fd, the bucket position command generating unit Fe, and the command value calculating unit Ff are separated for the sake of convenience of explanation, but they need not be physically separated, and they may consist of software components or hardware components that are common to all or part of them.

The landform determination unit Fa is configured to determine a landform. In the example illustrated in FIG. 10, the landform determination unit Fa determines whether a slope is present around the shovel 100 based on the output of the space recognition device 70.

The shovel position calculating unit Fb is configured to calculate the position of the shovel 100. In the example illustrated in FIG. 10, the shovel position calculating unit Fb calculates the position (latitude, longitude, and altitude) of the shovel 100 based on the output of the positioning device 73.

The position comparison unit Fc is configured to compare the position of a slope determined to be present by the landform determination unit Fa with the position of the shovel 100 calculated by the shovel position calculating unit Fb. With this configuration, the position comparison unit Fc can determine whether the shovel 100 is ascending the slope.

The bucket position calculating unit Fd is configured to calculate the position of a predetermined point P1 on the bucket 6. In the example illustrated in FIG. 10, the bucket position calculating unit Fd calculates the position of the predetermined point P1 that is a point on the bucket 6 that is the most forwardly positioned in the traveling direction of the shovel 100 based on the output of the positioning device 73 and the output of the attitude detecting device. The predetermined point P1 of the bucket 6 is, for example, a point on the bottom surface of the bucket 6, a point on the back surface, or a point on the toe of the bucket 6, and the like.

The bucket position command generating unit Fe is configured to generate a command regarding the position of the bucket 6 (hereinafter referred to as a "bucket position command"). In the example illustrated in FIG. 10, the bucket position command generating unit Fe generates the bucket position command when the position comparison unit Fc determines that the shovel 100 is ascending a slope.

Specifically, the bucket position command generating unit Fe calculates the horizontal distance HD1 between the predetermined point P1 on the bucket 6 and the upper end P2 of the slope. When the horizontal distance HD1 is less than the predetermined value (zero), the bucket position command generating unit Fe determines that the bucket 6 has passed the upper end P2 of the slope. If it is determined that the bucket 6 has passed the upper end P2 of the slope, the bucket position command generating unit Fe generates the bucket position command so that the bucket 6 can be lowered. More specifically, the bucket position command generating unit Fe generates the bucket position command so that the bucket height, which is the vertical distance between the bucket 6 and the ground, is the predetermined value HT.

The command value calculating unit Ff is configured to calculate a command value for operating the actuator. In the example illustrated in FIG. 10, the command value calculating unit Ff calculates a command value $\beta_{1r}$ with respect to a boom angle $\beta_1$, a command value $\beta_{2r}$ with respect to an arm angle $\beta_2$, and a command value $\beta_{3r}$ with respect to a bucket angle $\beta_3$ based on the bucket position command generated by the bucket position command generating unit Fe. The command value calculating unit Ff calculates the command value $\beta_{1r}$ as necessary even when the boom 4 is not operated. This is to automatically operate the boom 4. The same applies to the arm 5 and the bucket 6.

Thereafter, the autonomous control unit 30B operates the boom cylinder 7 so that the actual boom angle $\beta_1$ is the same as the generated command value $\beta_{1r}$, the arm cylinder 8 is operated so that the actual arm angle $\beta_2$ is the same as the generated command value $\beta_{2r}$, and the bucket cylinder 9 is operated so that the actual bucket angle $\beta_3$ is the same as the generated command value $\beta_{3r}$.

Specifically, the autonomous control unit 30B generates a boom cylinder pilot pressure command corresponding to the difference $\Delta\beta1$ between the present value of the boom angle $\beta_1$ and the command value $\beta_{1r}$. The control current corresponding to the boom cylinder pilot pressure command is output to the boom control mechanism (not illustrated). The boom control mechanism is configured so that the pilot pressure corresponding to the control current corresponding to the boom cylinder pilot pressure command can be applied to the control valve 175 that serves as the boom control valve. The boom control mechanism may be, for example, a proportional valve 31BL and a proportional valve 31BR in FIG. 4B.

Thereafter, the control valve 175, which receives the pilot pressure generated by the boom control mechanism, causes the hydraulic oil discharged by the main pump 14 to flow into the boom cylinder 7 in a direction and at a flow rate corresponding to the pilot pressure.

On this occasion, the autonomous control unit 30B may generate a boom spool control command based on the amount of spool displacement of the control valve 175 detected by a boom spool displacement sensor (not illustrated). The boom spool displacement sensor is a sensor that detects the displacement amount of the spool including the control valve 175. The controller 30 may output a control current corresponding to the boom spool control command to the boom control mechanism. In this case, the boom control mechanism applies a pilot pressure to the control valve 175 depending on the control current corresponding to the boom spool control command.

The boom cylinder 7 expands and contracts by hydraulic oil supplied through the control valve 175. The boom angle sensor S1 detects the boom angle $\beta_1$ of the boom 4 that is driven by the boom cylinder 7 that expands and contracts.

Thereafter, the autonomous control unit 30B feeds back the boom angle $\beta_1$ detected by the boom angle sensor S1 as the present value of the boom angle $\beta_1$ used in generating the boom cylinder pilot pressure command.

The above description relates to the operation of the boom 4 based on the command value $\beta_{1r}$, but it is equally applicable to the operation of the arm 5 based on the command value $\beta_{2r}$ and the operation of the bucket 6 based on the command value $\beta_{3r}$. The arm control mechanism (not illustrated) is configured so that the pilot pressure corresponding to the control current corresponding to the arm cylinder pilot pressure command can be applied to the control valve 176 that serves as an arm control valve. The arm control mechanism may be, for example, the proportional valve 31AL and the proportional valve 31AR in FIG. 4A. The bucket control mechanism (not illustrated) is configured so that the pilot pressure depending on the control current corresponding to the bucket cylinder pilot pressure command can be applied to the control valve 174 that serves as a bucket control valve. The bucket control mechanism may be, for example, the proportional valve 31CL and the proportional valve 31CR in FIG. 4C.

Figure 11:
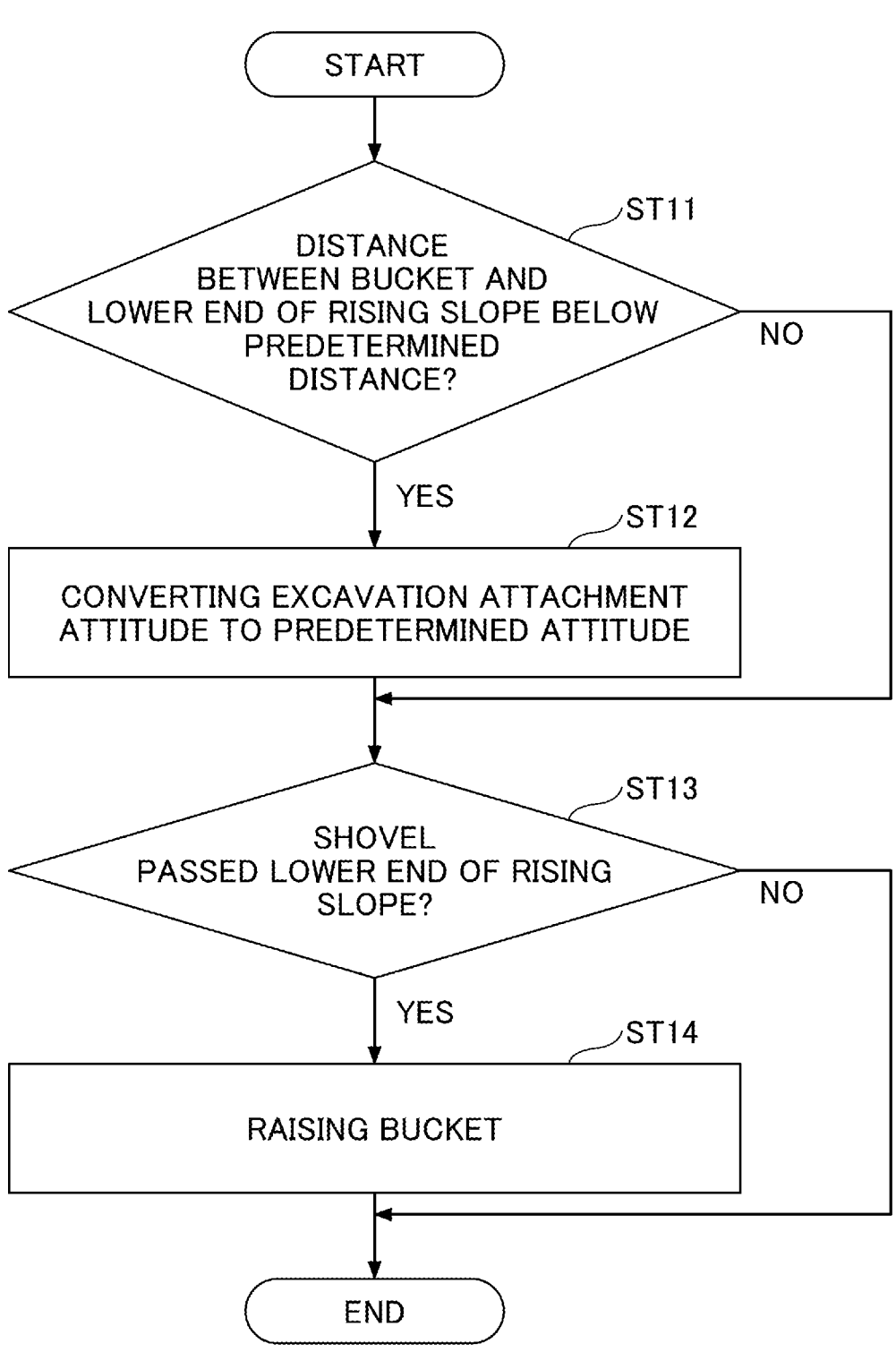
FIG. 11 is a flowchart of a second autonomous control process.

Next, another example of a process in which the autonomous control unit 30B autonomously controls the shovel 100 will be described with reference to FIG. 11. FIG. 11 is a flowchart of a process in which an autonomous control unit 30B autonomously controls an attitude of an excavation attachment AT of a shovel 100 approaching a slope (hereinafter referred to as a "second autonomous control process"). The autonomous control unit 30B repeatedly performs the second autonomous control process with a predetermined control cycle when the shovel 100 is approaching the slope.

First, the autonomous control unit 30B determines whether a predetermined starting condition has been met, that is, whether a first remaining distance, which is the distance between the bucket 6 and the lower end of the slope, is below a predetermined distance (step ST11). In this example, the autonomous control unit 30B derives the horizontal distance between the predetermined point P1 on the bucket 6 and the lower end of the slope as the first remaining distance based on, for example, the output of the positioning device 73 and the landform data preliminarily stored in the non-volatile storage device. The autonomous control unit 30B may derive the first remaining distance based on the output of the forward sensor 70F. The autonomous control unit 30B compares the derived first remaining distance with the predetermined distance stored in the non-volatile storage device or the like.

If it is determined that the first remaining distance is not less than the predetermined distance (NO in step ST11), the autonomous control unit 30B executes the step ST13 without changing the attitude of the excavation attachment AT.

If it is determined that the first remaining distance is less than the predetermined distance (YES in step ST11), the autonomous control unit 30B converts the position of the excavation attachment AT to a predetermined position (step ST12). In this example, the autonomous control unit 30B converts the current excavation attachment AT to a climbing attitude by expanding and contracting at least one of the boom cylinder 7, the arm cylinder 8, and the bucket cylinder 9 to so that the bucket height is maintained at a predetermined value.

Thereafter, in Step ST13, the autonomous control unit 30B determines whether another starting condition has been satisfied, that is, whether the shovel 100 has passed through the lower end of the slope. In this example, the autonomous control unit 30B determines whether the first remaining distance reaches zero. Then, when the first remaining distance reaches zero, it is determined that the shovel 100 has passed the lower end of the slope.

If it is determined that the shovel 100 has not passed the lower end of the slope (NO in step ST13), the autonomous control unit 30B terminates the second autonomous control process without changing the attitude of the excavation attachment AT.

If it is determined that the center of the shovel 100 or the center of gravity has passed through the lower end of the slope (YES in step ST13), the autonomous control unit 30B raises the bucket 6 (step ST14). In this embodiment, the autonomous control unit 30B extends the boom cylinder 7 and raises the boom 4 so that the height of the bucket, which is the vertical distance between the bucket 6 and the ground (the inclination of the slope), is a predetermined value. The height of the bucket may be a vertical distance between the toe of the bucket 6 and the ground (the slope of the slope).

With this configuration, the operator of the shovel 100 can convert the attitude of the excavation attachment AT into a climbing attitude by simply operating the traveling lever 26D so as to move the shovel 100 close to an ascending slope.

Further, the autonomous control unit 30B prevents the bucket 6 from colliding with the slope surface of the ascending slope when the shovel 100 clears the lower end of the ascending slope.

Figure 12:
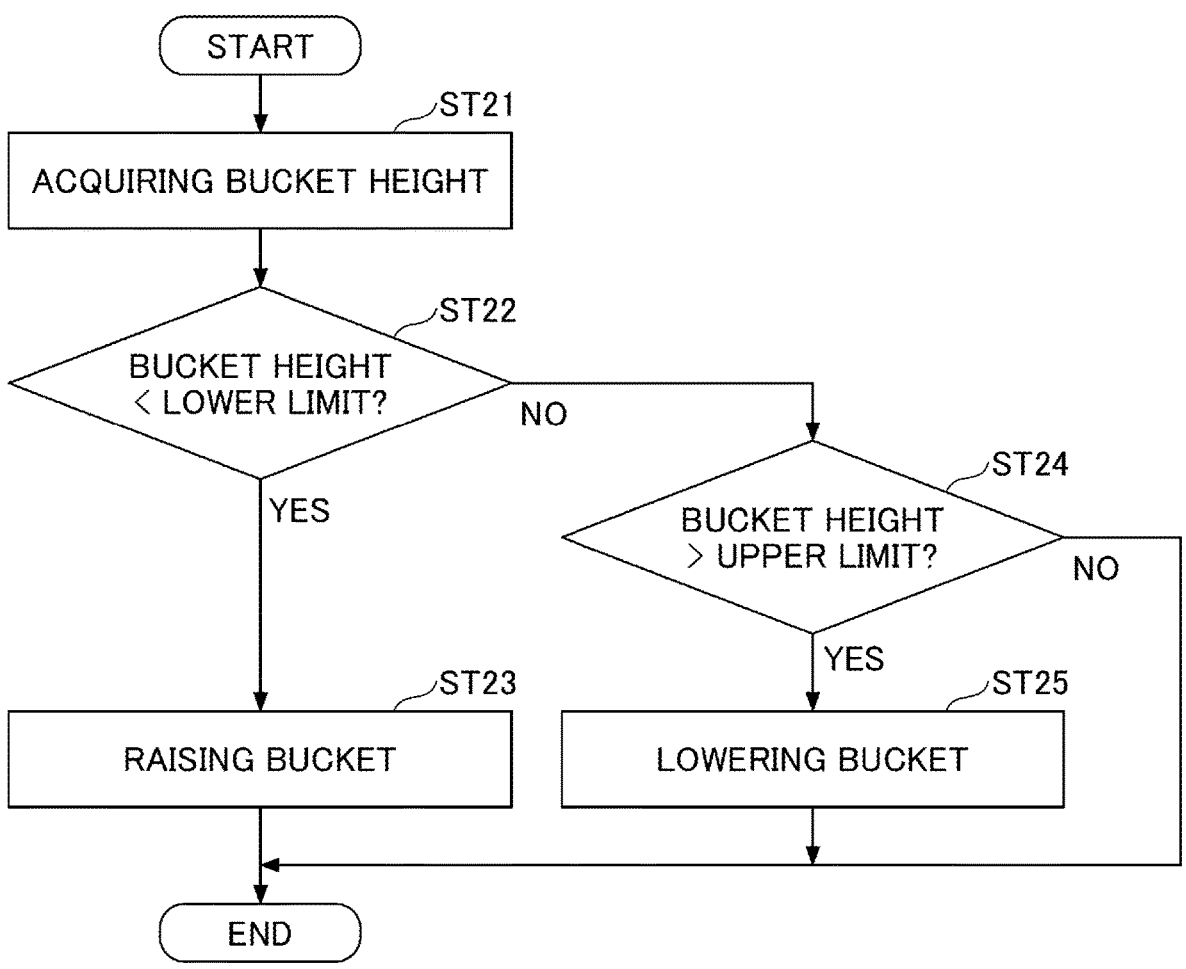
FIG. 12 is a flowchart of a third autonomous control process.

Next, another example of a process in which the autonomous control unit 30B autonomously controls the shovel 100 will be described with reference to FIG. 12. FIG. 12 is a flowchart of a process in which the autonomous control unit 30B autonomously controls an attitude of the excavation attachment AT of the shovel 100 ascending the slope (hereinafter referred to as a "third autonomous control process"). The autonomous control unit 30B repeatedly performs the third autonomous control process with a predetermined control cycle while the shovel 100 is ascending the slope.

First, the autonomous control unit 30B acquires the height of the bucket, which is the vertical distance between the bucket 6 and the ground (Step ST21). In this example, the autonomous control unit 30B calculates the vertical distance between the lowest point of the bucket 6 and the ground as the bucket height based on the landform data stored in advance in the non-volatile storage device and the output of the attitude detecting device.

The autonomous control unit 30B determines whether a predetermined start condition is satisfied, that is, whether the bucket height is below the lower limit value (step ST22). The lower limit value is a value that prevents the bucket 6 from contacting the slope while climbing the slope and is stored in advance in the non-volatile storage device.

If it is determined that the bucket height is below the lower limit value (YES in step ST22), the autonomous control unit 30B raises the bucket 6 (step ST23). In this example, the autonomous control unit 30B raises the bucket 6 by extending the boom cylinder 7 by a predetermined stroke amount. However, the autonomous control unit 30B may raise the bucket 6 by extension and retraction of the boom cylinder 7, extension and retraction of the arm cylinder 8, extension and retraction of the bucket cylinder 9, and a combination thereof.

If it is determined that the bucket height is equal to or more than the lower limit value (NO in step ST22), the autonomous control unit 30B determines whether the bucket height is greater than the upper limit value (Step ST24). Similar to the lower limit value, the upper limit value is a value that prevents the bucket 6 from contacting the slope while climbing the slope (a value higher than the lower limit value), and is stored in a non-volatile storage device in advance.

If it is determined that the bucket height exceeds the upper limit value (YES in step ST24), the autonomous control unit 30B lowers the bucket 6 (step ST25). In this example, the autonomous control unit 30B moves the bucket 6 down by causing the boom cylinder 7 to contract by a predetermined stroke amount. However, the autonomous control unit 30B may lower the bucket 6 by extending and contracting the boom cylinder 7, by extending and contracting the arm cylinder 8, by extending and contracting the bucket cylinder 9, and a combination thereof.

If it is determined that the bucket height is below the upper limit value (NO in step ST24), the autonomous control unit 30B terminates the third autonomous control process without changing the attitude of the excavation attachment AT.

In the above-described example, the autonomous control unit 30B determines whether the bucket height is larger than the upper limit value after determining that the bucket height is higher than the lower limit value. However, the autonomous control unit 30B may determine whether the bucket height is lower than the lower limit value after determining that the bucket height is lower than the upper limit value.

With this configuration, the autonomous control unit 30B can maintain the bucket height above the lower limit value and within the range below the upper limit value while the shovel 100 is slope. Therefore, the autonomous control unit 30B can maintain the position of the excavation attachment AT with an appropriate climbing attitude until the shovel 100 has passed the upper end P2 of the slope as in the case of performing the first autonomous control process illustrated in FIG. 7, and can prevent the tip of the lower traveling body 1 from rising.

Further, the autonomous control unit 30B may allow the shovel 100 to land slowly on a horizontal plane at the end of the slope while inhibiting pitching of the shovel 100 after the shovel 100 exceeds the upper end P2 of the slope.

Figure 13:
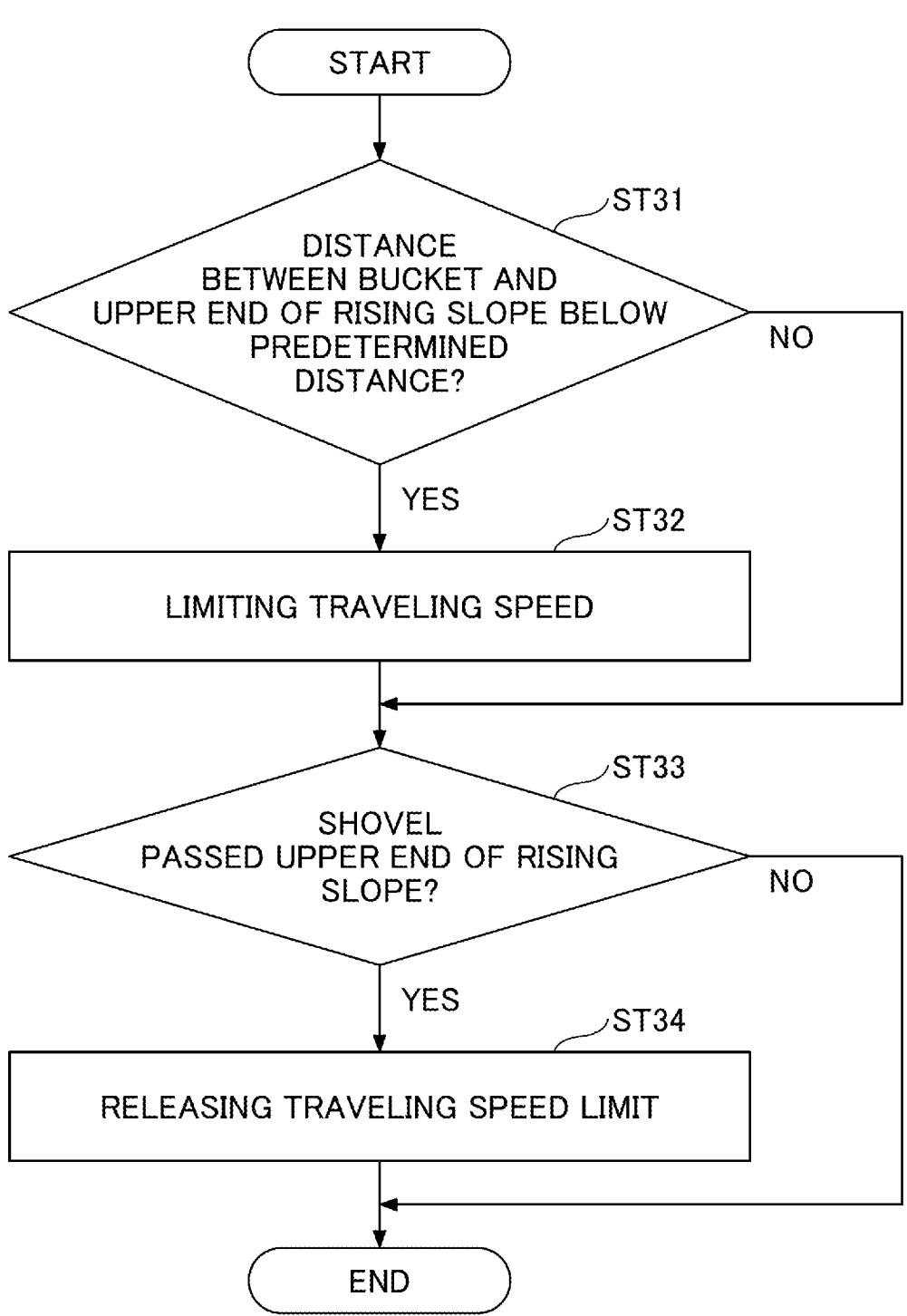
FIG. 13 is a flowchart of a fourth autonomous control process.

Next, another example of a process in which the autonomous control unit 30B autonomously controls the shovel 100 will be described with reference to FIGS. 13 and 14A to 14C. FIG. 13 is a flowchart of a process in which the traveling speed of the shovel 100 ascending the slope is autonomously controlled by the autonomous control unit 30B (hereinafter, referred to as a "fourth autonomous control process"). The autonomous control unit 30B repeatedly performs the fourth autonomous control process with a predetermined control cycle while the shovel 100 is ascending the slope. For example, the autonomous control unit 30B determines whether the shovel 100 is traveling based on the output of the operation pressure sensors 29DL and 29DR and determines whether the shovel 100 is positioned on the slope based on the output of the body inclination sensor S4.

When it is determined that the shovel 100 is positioned on a substantially horizontal plane, that is, when it is determined that the shovel 100 is not positioned on a slope plane, the autonomous control unit 30B may stop executing the fourth autonomous control process. When the attachment actuator is moved through the manual operation of the control device 26, the autonomous control unit 30B may stop executing the fourth autonomous control process. This is to prioritize the movement of the attachment actuator based on manual operation.

Figure 14A:
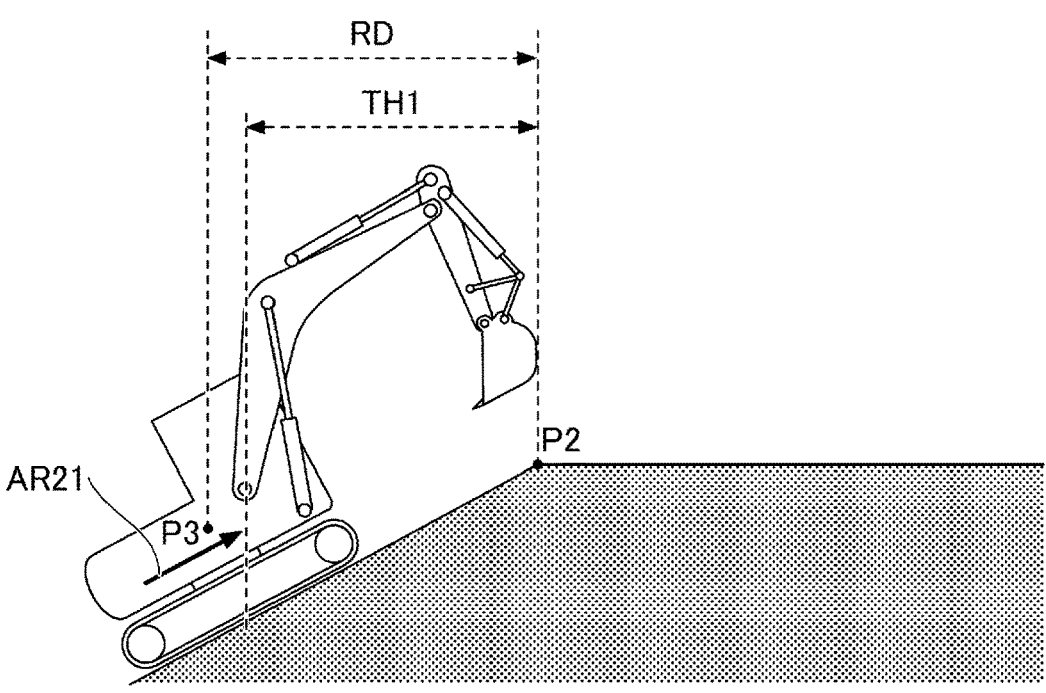
FIG. 14A is a side view of a shovel ascending a slope.
Figure 14B:
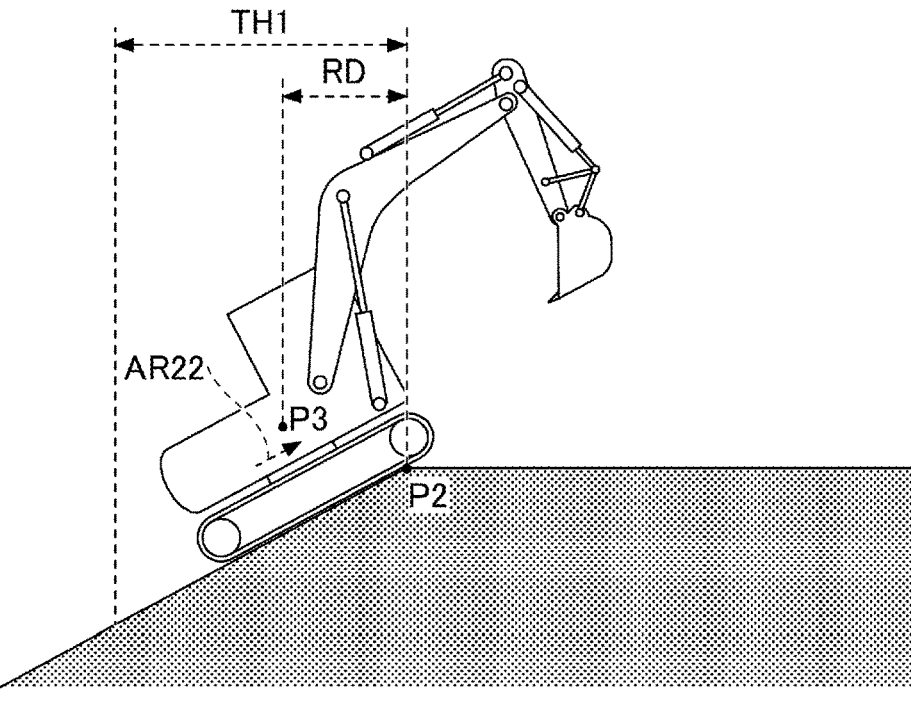
FIG. 14B is a side view of a shovel ascending a slope.
Figure 14C:
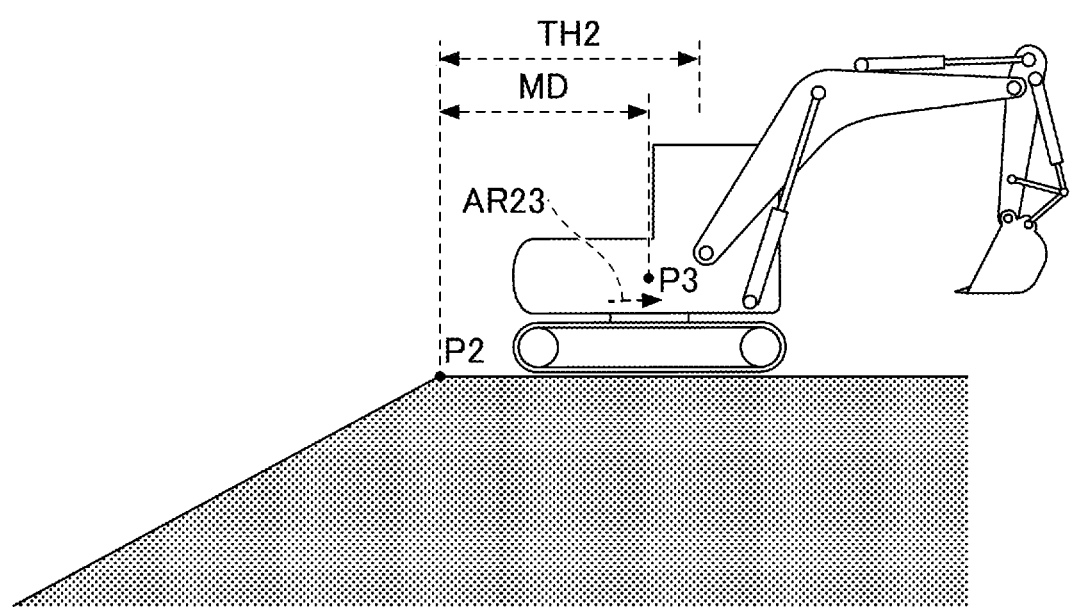
FIG. 14C is a side view of a shovel ascending a slope.

FIGS. 14A to 14C are side views of a shovel 100 ascending a slope. FIGS. 14A to 14C illustrate the movement of shovel 100 as the shovel 100 ascends a slope in the order of FIGS. 14A, 14B, and 14C.

First, the autonomous control unit 30B determines whether the predetermined start condition has been met, that is, whether the second remaining distance RD, which is the distance between the bucket 6 and the upper end P2 of the slope, is below the predetermined distance TH1 (step ST31). In this example, the autonomous control unit 30B derives the horizontal distance between the upper end P2 of the slope and the center point P3 of the shovel 100 as the second remaining distance RD based on, for example, the output of the positioning device 73 and the landform data preliminarily stored in a non-volatile storage device. Here, the second remaining distance RD may be a horizontal distance between the predetermined point P1 on the bucket 6 and the upper end P2 of the slope. The autonomous control unit 30B may derive a second remaining distance RD based on the output of the forward sensor 70F. The autonomous control unit 30B compares the derived second remaining distance RD with a predetermined distance TH1 stored in the non-volatile storage device or the like.

If it is determined that the second remaining distance RD is equal to or more than the predetermined distance TH1 (NO in step ST31), the autonomous control unit 30B executes the step ST33 without changing the driving speed.

If it is determined that the second remaining distance RD is lower than the predetermined distance TH1 (YES in Step ST31), the autonomous control unit 30B limits the traveling speed (Step ST32). In this example, the autonomous control unit 30B limits the traveling speed of the shovel 100 by reducing the amount of hydraulic oil supplied to the traveling hydraulic motor 2M regardless of the operation contents of the traveling lever 26D.

Specifically, as illustrated in FIG. 14A, the autonomous control unit 30B does not limit the traveling speed until the second remaining distance RD, which is the distance between the upper end P2 of the slope and the central point P3 of the shovel 100, falls below the predetermined distance TH1. Therefore, the shovel 100 travels at a speed corresponding to the operation amount of the traveling lever 26D. The long thick arrow AR21 of FIG. 14A shows the shovel 100 ascending the slope at a relatively high speed.

Meanwhile, as illustrated in FIG. 14B, the autonomous control unit 30B limits the traveling speed when the second remaining distance RD is lower than the predetermined distance TH1. Therefore, the shovel 100 travels at a predetermined limited speed even when the traveling lever 26D is maximally overturned. A short dotted arrow AR22 of FIG. 14B illustrates the shovel 100 traveling the slope at a relatively low speed limit.

Thereafter, the autonomous control unit 30B determines whether another starting condition has been satisfied, that is, whether the shovel 100 has passed through the upper end P2 of the slope (step ST33). In this example, as illustrated in FIG. 14C, the autonomous control unit 30B determines whether the traveling distance MD, which is the distance between the upper end P2 of the slope after the second remaining distance RD reaches zero and the central point P3 of the shovel 100, exceeds the predetermined distance TH2. Then, when the traveling distance MD is equal to or more than the predetermined distance TH2, it is determined that the shovel 100 has passed through the upper end P2 of the slope.

If it is determined that the shovel 100 has not passed the upper end P2 of the upstream slope (NO of the step ST33), the autonomous control unit 30B terminates the fourth autonomous control process without releasing the limit of the traveling speed.

In this example, as illustrated in FIG. 14C, the autonomous control unit 30B does not remove the limit of the traveling speed when the traveling distance MD is still below the predetermined distance TH2. Therefore, the shovel 100 travels at a predetermined limited speed even when the traveling lever 26D is maximally overturned. A short dotted arrow AR23 of FIG. 14C illustrates the shovel 100 traveling at a relatively low limit speed.

If it is determined that the shovel 100 has passed through the upper end P2 of the upstream slope (YES of the step ST33), the autonomous control unit 30B cancels the limit of the traveling speed (step ST34).

In this example, the autonomous control unit 30B cancels the limit of the traveling speed when the traveling distance MD is equal to or more than the predetermined distance TH2. Therefore, the shovel 100, for example, travels at a speed proportional to the amount of operation of the traveling lever 26D when the traveling lever 26D is operated again after the traveling lever 26D is returned to the neutral position. The autonomous control unit 30B may immediately cancel the limit of the traveling speed when the traveling distance MD reaches the predetermined distance TH2. In this case, the shovel 100 may accelerate by increasing the amount of hydraulic oil supplied to the traveling hydraulic motor 2M, even if the amount of operation of the traveling lever 26D does not change.

The autonomous control unit 30B may be configured to cancel the limit of the traveling speed when the boom-up operation is performed. The autonomous control unit 30B can presume that the shovel 100 has passed through the upper end P2 of the slope by detecting that a boom-up operation has been performed based on at least one signal output by the right operation lever 26R and the cylinder pressure, which is the pressure of the hydraulic oil in the boom cylinder 7.

With this configuration, the autonomous control unit 30B can prevent the shovel 100 from oscillating back and forth due to a sudden change in pitch angle of the shovel 100 due to the rise of the top of the lower traveling body 1 when the shovel 100 clears the upper end P2 of the slope.

FIG. 13 and FIGS. 14A to 14C illustrate an example in which the autonomous control unit 30B controls the traveling actuator based on the positional relationship between the upper end P2 of the slope and the center point P3 of the shovel 100. However, the autonomous control unit 30B may control the attachment actuator based on the change of the center point P3 (or the center of gravity position) of the shovel 100 when the shovel 100 crosses the upper end P2 of the slope. When the shovel 100 is climbing the slope, the center point P3 (or the center of gravity position) of the shovel 100 varies substantially linearly, but when the shovel 100 exceeds the upper end P2 of the slope, because the center point P3 (or the center of gravity position) of the shovel 100 rotates about the upper end P2, the autonomous control unit 30B can accurately understand the situation where the shovel 100 has passed the upper end P2 of the slope.

Figure 15:
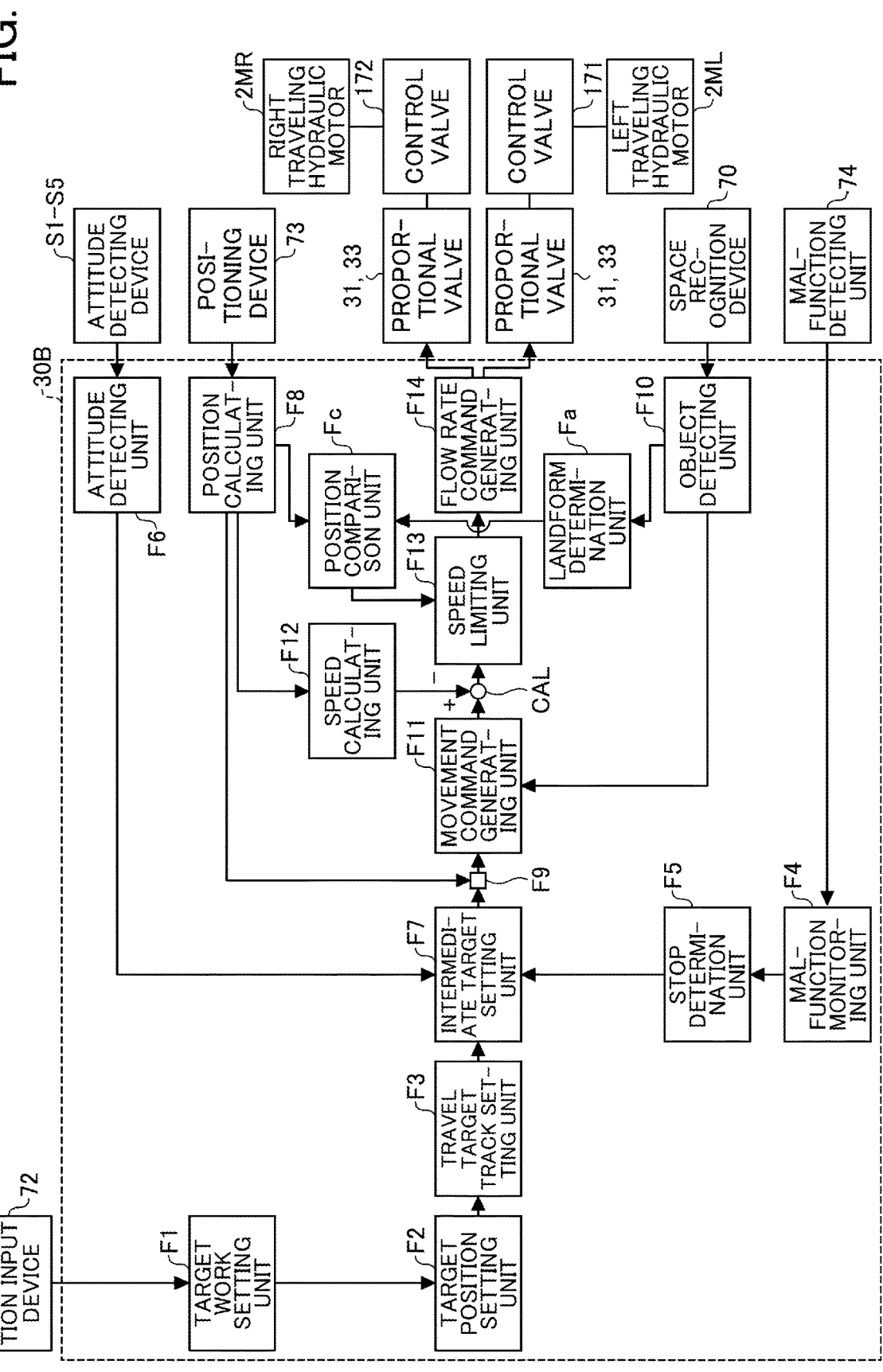
FIG. 15 is a block diagram illustrating another configuration example of an autonomous control unit.

Next, another configuration example of the autonomous control unit 30B will be described with reference to FIG. 15. FIG. 15 is a block diagram illustrating another example of a configuration of the autonomous control unit 30B. In the example illustrated in FIG. 15, the autonomous control unit 30B can achieve a motion of the shovel 100 as illustrated in FIGS. 14A to 14C.

Specifically, the autonomous control unit 30B is configured to receive signals output by at least one of an attitude detecting device, the space recognition device 70, the information input device 72, the positioning device 73, and a malfunction detecting sensor 74, perform various operations, and output a control command to the proportional valve 31 and the proportional valve 33. The attitude detecting device includes a boom angle sensor S1, an arm angle sensor S2, a bucket angle sensor S3, a body inclination sensor S4, and a swivel state sensor S5.

The autonomous control unit 30B includes a target work setting unit F1, a target position setting unit F2, a traveling target track generating unit F3, an malfunction monitoring unit F4, a stop determination unit F5, an attitude detecting unit F6, an intermediate target setting unit F7, a position calculating unit F8, a comparison unit F9, an object detecting unit F10, a movement command generating unit F11, a speed calculating unit F12, a speed limiting unit F13, a flow command generating unit F14, a landform determination unit Fa, a position comparison unit Fc, and a calculating unit CAL. The target work setting unit F1, the target position setting unit F2, the traveling target track generating unit F3, the malfunction monitoring unit F4, the stop determination unit F5, the attitude detecting unit F6, the intermediate target setting unit F7, the position calculating unit F8, the comparison unit F9, the object detecting unit F10, the movement command generating unit F11, the speed calculating unit F12, the speed limiting unit F13, the flow command generating unit F14, the landform determination unit Fa, the position comparison unit Fc, and the calculating unit CAL are described separately for convenience of explanation, but they are not required to physically separate, and they may be composed of software components or hardware components that are entirely or partially common.

The target work setting unit F1 is configured to set target work in accordance with an output of the information input device 72, that is, an operation input received by the information input device 72. The target work may be flat travel, slope travel, or downward slope travel, for example. The target work setting unit F1 may set the target work based on the information received from an external device through a communication device.

The target position setting unit F2 is configured to set the target position depending on an output of the information input device 72, that is, an operation input received by the information input device 72. The target position is, for example, the end point of flat travel, slope travel, or downward slope travel.

The traveling target track generating unit F3 generates a traveling target track for autonomous traveling of the shovel 100 (lower traveling body 1) based on the target work set by the target work setting unit F1 and the target position setting unit F2. In addition, the traveling target track generating unit F3 may set an acceptable error range for the generated traveling target track.

The malfunction monitoring unit F4 is configured to monitor a malfunction of the shovel 100. In an example illustrated in FIG. 15, the malfunction monitoring unit F4 determines the degree of malfunction of the shovel 100 based on the output of the malfunction detecting sensor 74. The malfunction detecting sensor 74 may be, for example, a sensor for detecting a malfunction in the engine 11, a sensor for detecting a malfunction in relation to a temperature of the hydraulic oil, or a sensor for detecting a malfunction in the controller 30.

The stop determination unit F5 is configured to determine whether it is necessary to stop the shovel 100 based on a variety pieces of information. In the example illustrated in FIG. 15, the stop determination unit F5 determines whether it is necessary to stop the shovel 100 during autonomous traveling based on the output of the malfunction monitoring unit F4. Specifically, the stop determination unit F5 determines that it is necessary to stop the shovel 100 during autonomous traveling when the degree of malfunction of the shovel 100 determined by the malfunction monitoring unit F4 exceeds a predetermined threshold value. In this case, for example, the autonomous control unit 30B controls the traveling hydraulic motor 2M as a traveling actuator by braking, and slows down or stops the rotation of the traveling hydraulic motor 2M. Meanwhile, for example, when the degree of malfunction of the shovel 100 determined by the malfunction monitoring unit F4 is equal to or less than a predetermined threshold value, the stop determination unit F5 determines that it is not necessary to stop the shovel 100 during autonomous traveling, that is, it is possible to continue autonomous traveling of the shovel 100. When a person (an operator) is mounted on the shovel 100, the stop determination unit F5 may determine whether autonomous traveling is canceled in addition to whether it is necessary to stop the shovel 100.

The attitude detecting unit F6 is configured to detect information about the attitude of the shovel 100. Further, the attitude detecting unit F6 may determine whether the position of the shovel 100 is in a traveling attitude. The attitude detecting unit F6 may be configured to allow execution of autonomous traveling of the shovel 100 when it is determined that the attitude of the shovel 100 is in the traveling attitude.

The intermediate target setting unit F7 is configured to set an intermediate target position regarding the autonomous traveling of the shovel 100. In an example illustrated in FIG.

15, when the attitude detecting unit F6 determines that the attitude of the shovel 100 is in the traveling attitude and the stop determination unit F5 determines that it is not necessary to stop the shovel 100, the intermediate target setting unit F7 may set a single intermediate target position or multiple intermediate target positions on the traveling target track.

The position calculating unit F8 is configured to calculate the present position of the shovel 100. In the example illustrated in FIG. 15, the position calculating unit F8 calculates the present position of the shovel 100 based on the output of the positioning device 73.

The comparison unit F9 is configured to compare the intermediate target position set by the intermediate target setting unit F7 with the present position of the shovel 100 calculated by the position calculating unit F8.

The object detecting unit F10 is configured to detect an object present around the shovel 100. In the example illustrated in FIG. 15, the object detecting unit F10 detects an object present around the shovel 100 based on the output of the space recognition device 70. The output of the space recognition device 70 is, for example, an image taken by a camera. The object detecting unit F10 generates a stop command for stopping autonomous traveling of the shovel 100 when an object (for example, a person) present in the traveling direction of the shovel 100 during autonomous traveling is detected.

The movement command generating unit F11 is configured to generate a command regarding a traveling movement of the lower traveling body 1. In the example illustrated in FIG. 15, the movement command generating unit F11 generates a command regarding the movement direction and a command regarding the movement speed (hereinafter, referred to as a "movement command") based on the comparison result of the comparison unit F9. For example, the movement command generating unit F11 may be configured to generate a movement command having a value that is larger than the difference between the intermediate target position and the present position of the shovel 100. The movement command generating unit F11 may be configured to generate a movement command that brings the difference close to zero.

In this manner, the autonomous control unit 30B performs the traveling control to the final target position while autonomously driving the shovel 100 to the respective intermediate target position. In addition, the movement command generating unit F11 may change the value of the movement command when it is determined that the shovel 100 is present in an inclined ground based on the preliminarily input information on the landform and the detected value of the positioning device 73. For example, when it is determined that the shovel 100 is on a downward slope, the movement command generating unit F11 may generate a value of the movement command corresponding to a speed that is slower than a normal speed. The movement command generating unit F11 may acquire information about a landform, such as an inclination of the ground, based on the output of the space recognition device 70. In addition, based on the output of the space recognition device 70, when it is determined that the surface of the road is large in irregularities by the object detecting unit F10 (for example, when it is determined that a large number of stones are present on the surface of the road), the movement command generating unit F11 may generate a value of the movement command corresponding to the speed that is decelerated from the normal speed. As described above, the movement command generating unit F11 may change the value of the movement command based on the information on the road surface on the traveling route. For example, when the shovel 100 moves from sand to gravel in a riverbed, the movement command generating unit F11 may automatically change the value of the movement command. Accordingly, the movement command generating unit F11 can change the traveling speed corresponding to the road surface condition.

The autonomous control unit 30B may further include a mode setting unit for setting a mode of operation of the shovel 100. In this case, when a crane mode is set as the mode of operation of the shovel 100, or when a slow mode, such as a low speed or a high torque mode, is set, the movement command generating unit F11 generates a value of the movement command corresponding to the low-speed mode. As described above, the movement command generating unit F11 may change the value of the movement command (the traveling speed) in accordance with the state of the shovel 100.

The speed calculating unit F12 is configured to calculate the current traveling speed of the shovel 100. In the example illustrated in FIG. 15, the speed calculating unit F12 calculates the current traveling speed of the shovel 100 based on the transition of the present position of the shovel 100 calculated by the position calculating unit F8. The calculating unit CAL is configured to calculate the difference between the speed corresponding to the movement command generated by the movement command generating unit F11 and the current traveling speed of the shovel 100 calculated by the speed calculating unit F12.

The speed limiting unit F13 is configured to limit the traveling speed of the shovel 100. In the example illustrated in FIG. 15, when the speed difference calculated by the calculating unit CAL exceeds the limit value, the speed limiting unit F13 outputs the limit value instead of the speed difference, and when the speed difference calculated by the calculating unit CAL is equal to or less than the limit value, the speed limiting unit F13 is configured to output the speed difference directly. The limit may be a preliminarily registered value or a dynamically calculated value.

In the example illustrated in FIG. 15, the speed limiting unit F13 is configured to limit the traveling speed of the shovel 100 based on the output of the position comparison unit Fc. Specifically, the speed limiting unit F13 is configured to limit the traveling speed of the shovel 100 in accordance with the fourth autonomous control process illustrated in FIG. 13.

The position comparison unit Fc is configured to compare a position of a slope determined to be present by the landform determination unit Fa with the present position of the shovel 100 calculated by the position calculating unit F8. With this configuration, the position comparison unit Fc can determine whether the shovel 100 is ascending the slope.

The landform determination unit Fa is configured to determine a landform. In the example illustrated in FIG. 15, the landform determination unit Fa determines whether a slope is present around the shovel 100 based on, for example, the output of the object detecting unit F10.

The flow command generating unit F14 is configured to generate a command regarding a flow rate of the hydraulic oil supplied from the main pump 14 to the traveling hydraulic motor 2M. In this example, the flow instruction producing unit F14 generates a flow instruction based on the speed difference output by the speed limiting unit F13. Basically, the flow command generating unit F14 may be configured to generate a flow command having a larger speed difference thereof. The flow command generating unit F14 may be configured to generate the flow command for bringing the speed difference calculated by the calculating unit CAL close to zero.

The flow command generated by the flow command generating unit F14 is a current command for the proportional valves 31 and 33. The proportional valves 31 and 33 operate in response to a current command thereof to change the pilot pressure acting on the pilot port of the control valve 171. Therefore, the flow rate of the hydraulic oil flowing into a left traveling hydraulic motor 2ML is adjusted to be the flow rate corresponding to the flow command generated by the flow command generating unit F14. The proportional valves 31 and 33 also operate in response to a current command thereof to change the pilot pressure acting on the pilot port of the control valve 172. Therefore, the flow rate of the hydraulic oil flowing into a right traveling hydraulic motor 2MR is adjusted to be the flow rate corresponding to the flow command generated by the flow command generating unit F14. As a result, the traveling speed of the shovel 100 is adjusted to be the traveling speed corresponding to the movement command generated by the movement command generating unit F11. The speed of the shovel 100 is a concept that includes the direction of travel. This is because traveling direction of the shovel 100 is determined based on the rotation speed and rotation direction of the left traveling hydraulic motor 2ML and the rotation speed and rotation direction of the right traveling hydraulic motor 2MR.

Meanwhile, in the example illustrated in FIG. 15, an example in which the flow rate command generated by the flow rate command generating unit F14 is output to the proportional valves 31 and 33 is illustrated. However, the autonomous control unit 30B is not limited to this configuration. For example, during the operation of the shovel 100, no other actuators other than the traveling hydraulic motor 2M, such as the boom cylinder 7, are normally operated. Therefore, the flow rate command generated by the flow rate command generating unit F14 may be output to the regulator 13 of the main pump 14. In this case, the autonomous control unit 30B can control the operation of the shovel 100 by controlling the discharge amount of the main pump 14. The autonomous control unit 30B may control steering of the shovel 100 by controlling each of the left regulator 13L and the right regulator 13R, that is, by controlling the discharge amount of each of the left main pump 14L and the right main pump 14R. Further, the autonomous control unit 30B may control the operation by controlling the amount of hydraulic oil supplied to each of the left traveling hydraulic motor 2ML and the right traveling hydraulic motor 2MR by the proportional valve 31, and may control the traveling speed by controlling the regulator 13.

As described above, the autonomous control unit 30B can implement autonomous traveling of the shovel 100 from the present position to the target position, as appropriate.

Figure 16:
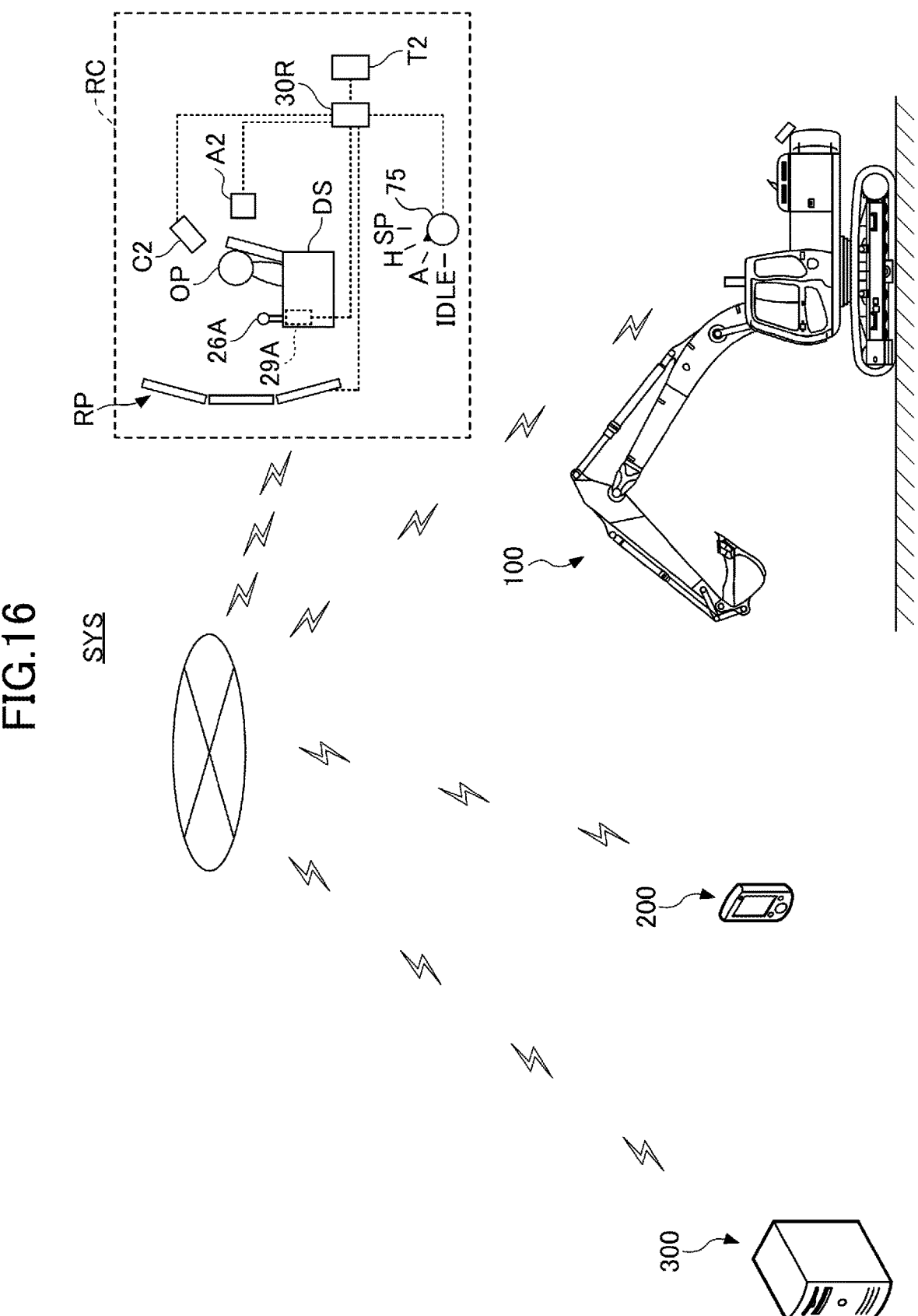
FIG. 16 is a schematic diagram illustrating an example of a construction system.

Next, a construction system SYS will be described with reference to FIG. 16. FIG. 16 is a schematic diagram showing an example of a construction system SYS. As illustrated in FIG. 16, the construction system SYS includes a shovel 100, a support device 200 and a management device 300. The construction system SYS is configured to support construction by one or more shovels 100.

The information obtained by the shovel 100 may be shared with the administrator and other operators of the shovel through the construction system SYS. Each of the shovel 100, the support device 200, and the management device 300 including the construction system SYS may be one or more. In the example illustrated in FIG. 16, the construction system SYS includes one shovel 100, one support device 200, and one management device 300.

The support device 200 is typically a portable terminal device, such as a laptop computer terminal, a tablet terminal, or a smartphone carried by a worker or the like at a construction site. The support device 200 may be a portable terminal carried by an operator of the shovel 100. The support device 200 may be a fixed terminal device.

The management device 300 is typically a fixed terminal device, for example, a server computer (so-called cloud server) installed in a management center or the like outside the construction site. The management device 300 may be, for example, an edge server configured at a construction site. Also, the management device 300 may be a portable terminal device (for example, a laptop computer terminal, a tablet terminal, or a portable terminal such as a smartphone).

At least one of the support device 200 and the management device 300 may include a monitor and a remote control device. In this case, an operator using the support device 200 or the management device 300 may operate the shovel 100 while using an operating device for remote control. The remote control device is communicatively connected to the controller 30 mounted on the shovel 100 via, for example, a wireless communication network, such as a short-range wireless communication network, a cellular telephone communication network, or a satellite communication network.

The various information images displayed on the display device D1 disposed in the cabin 10 (for example, image information representing the circumference of the shovel 100, various setting screens, and the like) may be displayed on a display device connected to at least one of the support device 200 and the management device 300. Image information representing the circumference of the shovel 100 may be generated based on a captured image of an imaging device (for example, an imaging device as space recognition device 70). Accordingly, a person using the support device 200 or a manager using the management device 300 may remotely control the shovel 100 or make various settings regarding the shovel 100 while checking the condition around the shovel 100.

For example, in the construction system SYS, the controller 30 of the shovel 100 may transmit information about at least one of time and a location when the switch NS is pressed, a target track used to autonomously operate the shovel 100, and a path actually traced to a predetermined portion during autonomous operation to at least one of the support device 200 and the management device 300. The controller 30 may then transmit the captured image of the imaging device to at least one of the support device 200 and the management device 300. The captured image may be a plurality of images captured during autonomous operation. Additionally, the controller 30 may transmit information about at least one of the support device 200 and the management device 300, such as data about the operation of the shovel 100 during autonomous operation, data about the attitude of the shovel 100, and data about the attitude of the excavation attachment. Thus, a worker using the support device 200 or an administrator using the management device 300 can obtain information about the shovel 100 during autonomous operation.

In this manner, in the support device 200 or the management device 300, the type and position of the object to be monitored outside the monitoring range of the shovel 100 are stored in the storage unit in time series.

In this manner, the construction system SYS allows information about the shovel 100 to be shared with the administrator and other operators of the shovel.

As illustrated in FIG. 16, the communication device mounted in the shovel 100 may be configured to transmit and receive information to and from the communication device T2 installed in the remote control room RC through wireless communication. In the example illustrated in FIG. 16, the communication device and the communication device T2 mounted on the shovel 100 are configured to transmit and receive information through a 5G mobile communication line (5G line), an LTE line, or a satellite line.

The remote control room RC includes a remote controller 30R, a sound output device A2, an indoor imaging device C2, a display device RP, a communication device T2 and the like. Further, in the remote control room RC, the driver's seat DS on which an operator OP who remotely controls the shovel 100 sits, is installed.

The remote controller 30R is an arithmetic device that performs various operations. In the example illustrated in FIG. 16, the remote controller 30R, like the controller 30, is composed of a microcomputer including a CPU and a memory. The various functions of the remote controller 30R are implemented when the CPU executes a program stored in the memory.

The sound output device A2 is configured to output a sound. In the example illustrated in FIG. 16, the sound output device A2 is a speaker and is configured to play back the sound collected by the sound collector (not illustrated) mounted to the shovel 100.

The indoor imaging device C2 is configured to image the inside of the remote control room RC. In the example illustrated in FIG. 16, the indoor imaging device C2 is a camera installed inside the remote control room RC and is configured to image an operator OP who sits on the driver's seat DS.

The communication device T2 is configured to control wireless communication with the communication device mounted on the shovel 100.

In the example illustrated in FIG. 16, the operator's seat DS has a structure similar to that of the operator's seat, which is located in the cabin of a conventional shovel. Specifically, the left console box is located on the left side of the driver's seat DS, and the right console box is located on the right side of the driver's seat DS. The left manipulation lever is located at the front end of the top of the left console box, and the right manipulation lever is located at the front end of the top of the right console box. A traveling lever and a traveling pedal are positioned in front of the driver's seat DS. In addition, a dial 75 is disposed at the center of the top surface of the right console box. A left control lever, a right control lever, a drive lever, a drive pedal, and a dial 75 constitute the control unit 26A.

The dial 75 is a dial for adjusting the rotational speed of the engine 11, and is configured so that, for example, the rotational speed of the engine can be switched in four stages.

Specifically, the dial 75 is configured to be able to switch an engine RPM in four stages: an SP mode, an H mode, an A mode and an idling mode. The dial 75 transmits data regarding the setting of the engine speed to the controller 30.

The SP mode is a rotational speed mode selected when an operator OP wishes to prioritize the workload, using the highest engine rotational speed mode. The H mode is a rotational speed mode chosen by the operator OP to achieve both workload and fuel economy, and utilizes the second highest engine rotational speed. The mode A is a rotational speed mode chosen by the operator OP to operate the shovel with low noise while giving priority to fuel economy, and uses the third highest engine rotational speed. The idling mode is a rotational speed mode selected when an operator OP wishes to make the engine idle, and utilizes the lowest engine rotational speed. The engine 11 is constantly controlled by the selected engine rotational speed in the rotational speed mode through the dial 75.

An operation sensor 29A is provided in an operation device 26A for detecting operation contents of the operation device 26A. The operation sensor 29A may be, for example, an inclination sensor that detects an inclination angle of the operation lever or an angle sensor that detects an oscillation angle about the oscillation axis of an operation lever. The operation sensor 29A may be composed of other sensors such as a pressure sensor, a current sensor, a voltage sensor, or a distance sensor. The operation sensor 29A outputs information about the operation contents of the detected operation device 26A to the remote controller 30R. The remote controller 30R generates an operation signal based on the received information and transmits the generated operation signal to the shovel 100. The operation sensor 29A may be configured to generate an operation signal. In this case, the operation sensor 29A may output an operation signal to the communication device T2 without going through the remote controller 30R.

The display device RP is configured to display information regarding the circumference of the shovel 100. In the example illustrated in FIG. 16, the display device RP is a multi-display composed of nine monitors in three columns (three columns long and three columns wide) and is configured to display the front, left, and right spaces of the shovel 100. Each monitor may be a liquid crystal monitor or an organic EL monitor. However, the display device RP may include one or more curved monitors or may include a projector.

The display device RP may be a display device wearable by an operator OP. For example, the display device RP may be a head-mounted display and may be configured to transmit and receive information from the remote controller 30R via wireless communication. The head-mounted display may be wired to a remote controller. The head-mounted display may be a transmissive head-mounted display or a non-transmissive head-mounted display. The head-mounted display may be a monocular head-mounted display or a binocular head-mounted display.

The display device RP is configured to display an image that allows an operator OP in the remote control room RC to view the surrounding of the shovel 100. That is, the display device RP displays an image so that the operator, while in the remote control room RC, can check the circumference of the shovel 100 as if the operator were in the cabin 10 of the shovel 100.

Figure 17:
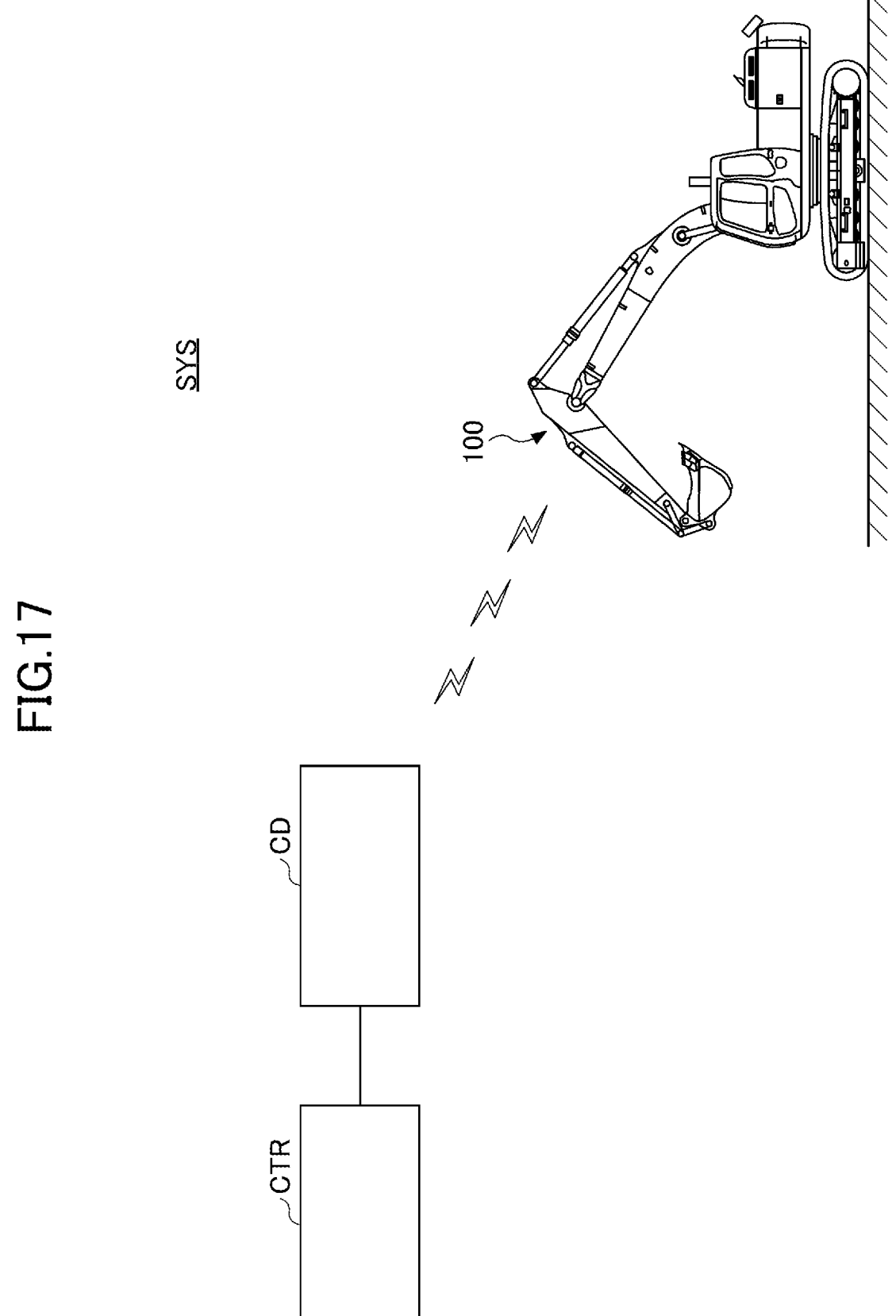
FIG. 17 is another example of the construction system illustrated schematically.

Next, another configuration example of the construction system SYS will be described with reference to FIG. 17. In the example illustrated in FIG. 17, the construction system SYS is configured to support construction by the shovel 100. Specifically, the construction system SYS includes a communication device CD and a control device CTR for communicating with the shovel 100. The controller CTR is configured to operate at least one of the traveling actuator and the attachment actuator autonomously in response to an inclination of the ground on which the lower traveling body 1 is traveling.

For example, a controller CTR may be configured to operate the attachment actuator autonomously to inhibit pitching of the upper swiveling body 3 that occurs when the ground incline changes.

Alternatively, the controller CTR may be configured to operate the attachment actuator autonomously in response to a change in the inclination of the upper swiveling body 3.

Alternatively, the controller CTR may limit the traveling speed of the traveling actuator to reduce the traveling speed of the lower traveling body 1 before the inclination of the ground changes. Alternatively, the controller CTR may restrict the movement of the traveling actuator so that the larger the change in the inclination of the ground, the smaller the traveling speed of the lower traveling body 1. Alternatively, the controller CTR may be configured to recognize the ground inclination based on the landform data preliminarily stored in the memory. Alternatively, the controller CTR may be configured to recognize a ground inclination based on the output of the space recognition device 70. Alternatively, the controller CTR may be configured so that the lower traveling body 1 can automatically control an attachment while traveling. Alternatively, the controller CTR may be configured to automatically reduce the movement commands by the operator. Alternatively, the controller CTR may be configured to generate a command value separately for the left traveling hydraulic motor 2ML and the right traveling hydraulic motor 2MR.

The first control unit and the second control unit are represented separately for the sake of convenience of description, but need not be physically distinguished. The first control unit and the second control unit may be composed of software components or hardware components that are common in whole or in part.

As described above, the shovel 100 according to the embodiment of the present invention includes a lower traveling body 1, an upper swiveling body 3 that is pivotally mounted on the lower traveling body 1, a drilling attachment AT that is mounted on the upper pivoting body 3, a traveling actuator that drives the lower traveling body 1, a traveling hydraulic motor 2M, a boom cylinder 7, an arm cylinder 8, and a bucket cylinder 9 that act as an attachment actuator that moves the excavation attachment, and a controller 30 that serves as a control device provided on the upper swiveling body 3. The controller 30 is configured to operate at least one of the traveling actuator and the attachment actuator autonomously according to the inclination of the ground on which the lower traveling body 1 is traveling. With this configuration, the controller 30 can inhibit the oscillation during traveling of the shovel 100.

The controller 30 is preferably configured to autonomously actuate the attachment actuator to inhibit pitching of the upper swiveling body 3 that occurs when the inclination of the ground changes. For example, the controller 30 may be configured to shrink the boom cylinder 7 when the bucket 6 traverses over the upper end P2 of the slope, as illustrated in FIG. 8C. The controller 30 may be configured to extend the boom cylinder 7 when the counterweight thereafter rises, as illustrated in FIG. 9B. This configuration allows the controller 30 to inhibit pitching of the shovel 100 that occurs when the shovel 100 has passed the upper end P2 of the slope.

The controller 30 is preferably configured to operate the attachment actuator autonomously in response to a change in tilt of the upper swiveling body 3. For example, the controller 30 may be configured to operate an attachment actuator such that the greater the inclination of the slope on which the shovel 100 is traveling, the more the center of gravity of the shovel 100 moves forward and downward. This configuration allows the controller 30 to achieve an excavation attachment AT attitude suitable for the size of the inclination of the slope over which the shovel 100 is about to go. Accordingly, the controller 30 can efficiently inhibit pitching of the shovel 100 that occurs when the shovel 100 clears the upper end P2 of a slope.

The controller 30 is preferably configured to limit the movement of the traveling actuator before the inclination of the ground changes to reduce the traveling speed of the lower traveling body 1. For example, as illustrated in FIG. 14A, the controller 30 may be configured to start limiting the movement of the traveling hydraulic motor 2M when the distance between the shovel 100 approaching the upper end P2 of the slope and the upper end P2 of the slope falls below a predetermined distance. As illustrated in FIG. 14C, the controller 30 may be configured to cancel the limitation on movement of the traveling hydraulic motor 2M when the distance between the shovel 100 moving away from the upper end P2 of the slope and the upper end P2 of the slope exceeds the predetermined distance. This configuration allows the controller 30 to inhibit pitching of the shovel 100 that occurs when the shovel 100 clears the upper end P2 of the slope, as well as autonomously operating the attachment actuator.

The controller 30 is preferably configured to limit the movement of the traveling actuator such that the larger the change in the inclination of the ground, the smaller the traveling speed of the lower traveling body 1. For example, the controller 30 may be configured to restrict the movement of the traveling actuator such that the larger the inclination of the slope over which the shovel 100 is about to go, the lower the traveling speed when the shovel 100 clears the upper end P2 of the slope. This configuration allows the controller 30 to achieve a traveling speed appropriate to the inclination of the slope over which the shovel 100 is about to go. Accordingly, the controller 30 can efficiently inhibit pitching of the shovel 100 that occurs when the shovel 100 clears the upper end P2 of the slope.

The controller 30 may be configured to recognize the slope of the ground based on the landform data preliminarily stored in the storage device. Alternatively, the controller 30 may be configured to recognize ground inclination based on the output of the space recognition device 70 mounted on the upper swiveling body 3. With these configurations, the controller 30 can recognize a ground inclination with high precision and perform autonomous control of the travel actuator and attachment actuator with higher precision.

The preferred embodiment of the present invention has been described in detail above. However, the invention is not limited to the embodiments described above. Various modifications, substitutions, and the like may be applied to the embodiments described above without departing from the scope of the invention. Also, the features described separately may be combined unless there is a technical inconsistency.

For example, in the above described embodiment, the autonomous control unit 30B is configured to autonomously control the attitude of the excavation attachment AT of the shovel 100 ascending slope. However, the autonomous control unit 30B may be configured to autonomously control the attitude of the excavation attachment AT of the shovel 100 traveling along a downward slope.

In the above described embodiment, the autonomous control unit 30B is configured to autonomously control an attachment actuator (boom cylinder 7) as described with reference to FIGS. 7, 8A to 8C, and 9A to 9D, or is configured to autonomously control a travel actuator (travel hydraulic motor 2M) as described with reference to FIGS. 13 and 14A to 14C. However, the autonomous control unit 30B may be configured to simultaneously and autonomously control an attachment actuator and a travel actuator when a predetermined start condition is satisfied.

Also, in the embodiments described above, a hydraulic control lever with a hydraulic pilot circuit is disclosed. For example, in the hydraulic pilot circuit for the left manipulation lever 26L, hydraulic oil supplied from the pilot pump 15 to the left manipulation lever 26L is transferred to the pilot ports of the control valves 176L and 176R at a flow rate corresponding to the opening of the remote control valves which are opened and closed by tilting the left manipulation lever 26L in the arm opening direction. Alternatively, in the hydraulic pilot circuit for the right manipulation lever 26R, hydraulic oil supplied from the pilot pump 15 to the right manipulation lever 26R is transferred to the pilot ports of the control valves 175L and 175R at a flow rate corresponding to the opening of the remote control valves that are opened and closed by tilting the right manipulation lever 26R in the boom direction.

However, an electrically operated lever with an electrically operated pilot circuit instead of a hydraulic operated lever with such a hydraulic pilot circuit may be employed. In this case, the lever operation amount of the electric operation lever is input to the controller 30, for example, as an electrical signal. A solenoid valve is also disposed between the pilot pump 15 and the pilot port of each control valve. The solenoid valves are configured to operate in response to electrical signals from the controller 30. This configuration allows the controller 30 to control the solenoid valves by an electrical signal corresponding to the amount of lever operated to increase or decrease the pilot pressure to move each control valve when it is manually operated using an electric control lever.

What is claimed is:

1. A control device for a shovel, the shovel including: a lower traveling body; an upper swiveling body rotatably mounted on the lower traveling body; an attachment attached to the upper swiveling body, the attachment including a bucket; a traveling actuator configured to drive the lower traveling body; and an attachment actuator configured to move the attachment, the control device comprising:
  processing circuitry configured to, while the shovel is approaching an ascending slope,
    autonomously determine whether a horizontal distance between the bucket and a lower end of the ascending slope is less than a predetermined distance, the horizontal distance being measured perpendicular to a direction of gravity, and
    autonomously operate the attachment actuator to maintain a height of the bucket at a predetermined value in response to determining that the horizontal distance is less than the predetermined distance.

2. A shovel comprising:
  a lower traveling body;
  an upper swiveling body rotatably mounted on the lower traveling body;
  an attachment attached to the upper swiveling body, the attachment including a bucket;
  a traveling actuator configured to drive the lower traveling body;
  an attachment actuator configured to move the attachment; and
  the control device as set forth in claim 1.

3. The control device for the shovel as claimed in claim 1, wherein the processing circuitry is further configured to
  autonomously determine that the shovel has passed the lower end of the ascending slope in response to determining that the horizontal distance is zero, and autonomously operate the attachment actuator to raise the bucket in response to determining that the shovel has passed the lower end of the ascending slope.

4. A control device for a shovel, the shovel including: a lower traveling body; an upper swiveling body rotatably mounted on the lower traveling body; an attachment attached to the upper swiveling body, the attachment including a bucket; a traveling actuator configured to drive the lower traveling body; and an attachment actuator configured to move the attachment, the control device comprising:
  processing circuitry configured to, while the shovel is ascending a slope,
    autonomously determine whether the bucket has passed an upper end of the slope based on a horizontal distance between the bucket and the upper end of the slope, the horizontal distance being measured perpendicular to a direction of gravity,
    autonomously operate the attachment actuator to lower the bucket in response to determining that the bucket has passed the upper end of the slope,
    autonomously determine, after lowering the bucket, whether a counterweight of the shovel is lifted as a front end of the lower traveling body protruding in air is lowered, and
    autonomously operate the attachment actuator to raise the bucket in response to determining that the counterweight is lifted.

5. The control device for the shovel as claimed in claim 4, wherein the processing circuitry is further configured to, while the shovel is ascending the slope,
  autonomously operate the attachment actuator so as to prevent the bucket from contacting a ground of the slope, based on a vertical distance between the bucket and the ground, the vertical distance being measured along the direction of gravity, and
  autonomously compare the vertical distance with a lower limit value and an upper limit value and operate the attachment actuator based on a result of said comparing so as to maintain the vertical distance within a range between the lower limit value and the upper limit value.

6. The control device for the shovel as claimed in claim 5, wherein the processing circuitry is further configured to, while the shovel is ascending the slope,
  autonomously determine whether the vertical distance is less than the lower limit value and whether the vertical distance is more than the upper limit value, and
  autonomously operate the attachment actuator to raise the bucket in response to determining that the vertical distance is less than the lower limit value and autonomously operate the attachment actuator to lower the bucket in response to determining that the vertical distance is more than the upper limit value.

7. A shovel comprising:
  a lower traveling body;
  an upper swiveling body rotatably mounted on the lower traveling body;
  an attachment attached to the upper swiveling body, the attachment including a bucket;
  a traveling actuator configured to drive the lower traveling body;
  an attachment actuator configured to move the attachment; and
  the control device as set forth in claim 4.

* * * * *